United States Patent
Yang et al.

(10) Patent No.: US 11,012,543 B2
(45) Date of Patent: *May 18, 2021

(54) V2X COMMUNICATION APPARATUS AND METHOD FOR TRANSMITTING/RECEIVING MULTIMEDIA CONTENT THEREBY

(71) Applicant: LG ELECTRONICS INC., Seoul (KR)

(72) Inventors: Seungryul Yang, Seoul (KR); Woosuk Ko, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/871,872

(22) Filed: May 11, 2020

(65) Prior Publication Data

US 2020/0274954 A1 Aug. 27, 2020

Related U.S. Application Data

(63) Continuation of application No. 16/407,953, filed on May 9, 2019, now Pat. No. 10,686,917, which is a
(Continued)

(51) Int. Cl.
*H04L 29/06* (2006.01)
*H04W 4/40* (2018.01)
(Continued)

(52) U.S. Cl.
CPC ............ *H04L 69/22* (2013.01); *G06F 40/263* (2020.01); *H04B 7/2612* (2013.01); *H04L 29/08* (2013.01); *H04W 4/02* (2013.01); *H04W 4/40* (2018.02)

(58) Field of Classification Search
None
See application file for complete search history.

(56) References Cited

U.S. PATENT DOCUMENTS 10,686,917 B2 * 6/2020 Yang ................. H04L 69/22
2002/0078228 A1 6/2002 Kuisma et al.
(Continued)

FOREIGN PATENT DOCUMENTS

| EP | 2 667 625 A2 | 11/2013 |
| KR | 10-2013-0043828 A | 5/2013 |
| KR | 10-1626686 B1 | 6/2016 |

OTHER PUBLICATIONS

Itri, "Discussion of the MBMS V2V transmission and reception", R2-162487, 3GPP TSG-RAN2 WG2 Meeting #93bis, Dubrovnik, Croatia, Apr. 11-15, 2016, pp. 1-2.
(Continued)

*Primary Examiner* — Diane L Lo
(74) *Attorney, Agent, or Firm* — Birch, Stewart, Kolasch & Birch LLP

(57) ABSTRACT

A method for receiving a multimedia content message by a vehicle to everything (V2X) communication apparatus, includes receiving a multimedia content message, and acquiring a multimedia content included in the multimedia content message or a content segment which is a part of the multimedia content, wherein the multimedia content message includes a header including a protocol version and a message ID, a management container including information of multimedia content message (MCM) management and multimedia content dissemination (MCD) protocol, a situation container including information for describing an event, a location container including information of the location of the event, and a multimedia container including the multimedia content.

14 Claims, 38 Drawing Sheets

Related U.S. Application Data continuation of application No. PCT/KR2017/010954, filed on Sep. 29, 2017.

(51) Int. Cl.
*H04B 7/26* (2006.01)
*H04L 29/08* (2006.01)
*H04W 4/02* (2018.01)
*G06F 40/263* (2020.01)

(56) References Cited

U.S. PATENT DOCUMENTS

2006/0271273 A1 11/2006 Lee et al.
2010/0057333 A1 3/2010 Yun
2010/0114465 A1 5/2010 Kim et al.
2010/0253549 A1 10/2010 Kim et al.
2016/0285935 A1 9/2016 Wu et al.

OTHER PUBLICATIONS

Lee et al., "Comparison and Analysis of V2X Message Protocol Standards for Vehicle Safety Services," Proceedings of Symposium of the Korean Institute of Communications and Information Sciences, Korea Institute of Communication Sciences, 2013, pp. 818-819, with an English abstract.

Unknown, "Intelligent Transport Systems (ITS); V2X Communications; Multimedia Content Dissemination Basic Service specification", European Telecommunications Standards Institute, DTS 103 152, V0.0.5, May 24, 2016, pp. 1-37.

Intelligent Transport Sysytems (ITS); V2X Communications; Multimedia Content Dissemination Basic Service specification. ETSI DTS 103 152 V0.0.6, Apr. 4, 2017, pp. 1-37.

* cited by examiner

V2X COMMUNICATION APPARATUS AND METHOD FOR TRANSMITTING/RECEIVING MULTIMEDIA CONTENT THEREBY

CROSS-REFERENCE TO RELATED APPLICATIONS

This application is a Continuation of U.S. patent application Ser. No. 16/407,953, filed on May 9, 2019 (now U.S. Pat. No. 10,686,917, issued on Jun. 16, 2020), which is a continuation bypass application of PCT International Application No. PCT/KR2017/010954 filed on Sep. 29, 2017, the contents of all of these applications are all hereby incorporated by reference herein in their entirety.

BACKGROUND ART

Technical Field

The present invention relates to a V2X communication apparatus and a method for transmitting/receiving a multimedia content thereof, and particularly, to a method for receiving a multimedia content message including a multimedia content and processing the multimedia content based on information included in the message.

Background Art

In recent years, vehicles have become a result of complex industrial technology, which is a fusion of electric, electronic, and communication technologies, centering on mechanical engineering and the vehicle is also called a smart car in such an aspect. Smart cars have been providing various customized mobile services as well as traditional vehicle technology such as traffic safety/complicatedness by connecting drivers, vehicles, and transportation infrastructures. The connectivity may be implemented using vehicle to everything (V2X) communication technology.

In addition to safety-related messages between vehicles, communication of a multimedia content may be required. However, due to characteristics of vehicle communication, transmission and reception of the multimedia content are performed quickly and stably and should not cause excessive communication traffic.

SUMMARY OF THE INVENTION

The present invention proposes a message format and a transmission/reception protocol for multimedia content communication between vehicles.

In order to achieve the technical object, disclosed are a vehicle to everything (V2X) communication apparatus and a method for receiving a multimedia content message by the V2X communication apparatus.

A method for receiving a multimedia content message according to an embodiment of the present invention includes: receiving a multimedia content message; parsing the multimedia content message; and acquiring a multimedia content included in the multimedia content message or a content segment which is a part of the multimedia content, and the multimedia content message includes a header including a protocol version and a message ID, a management container including multimedia content message (MCM) management and multimedia content dissemination (MCD) protocol related information, a situation container including information for describing an event, a location container including location information of the event, and a multimedia content container including the multimedia content, and the management container includes multimedia data unit number (numberOfMultimediaUnit) information which indicates the number of multimedia data units included in the multimedia container and multimedia format type (multimediaFormatType) information regarding the multimedia content included in the multimedia container.

In the method for receiving a multimedia content message according to the embodiment of the present invention, the management container further includes size information for at least one of the multimedia content or the segment of the multimedia content and the multimedia content message receiving method further includes determining whether to store the multimedia content or the content segment based on the size information and storage information of the V2X communication apparatus.

In the method for receiving a multimedia content message according to the embodiment of the present invention, the management container further includes multimedia content identifier information, and the multimedia content message receiving method further includes determining whether the multimedia content or the content segment of the multimedia content message overlaps with a previously received multimedia content based on the multimedia content identifier information.

In the method for receiving a multimedia content message according to the embodiment of the present invention, the management container further includes URL information, and the multimedia content message receiving method further includes receiving the multimedia content by accessing URL indicated by the URL information.

In the method for receiving a multimedia content message according to the embodiment of the present invention, the management container further includes language information indicating a language of the multimedia content, and, and the multimedia content message receiving method further includes determining whether the language of the multimedia content is an acceptable language based on the language information.

In the method for receiving a multimedia content message according to the embodiment of the present invention, the management container further includes valid time information, and, and the multimedia content message receiving method further includes determining whether to provide or forward the multimedia content based on the valid time information.

A V2X communication apparatus according to an embodiment of the present invention includes: a memory storing data; a communication unit transmitting and receiving a radio signal; and a processor controlling the communication unit, and the V2X communication apparatus receives a multimedia content message, parses the multimedia content message, and acquires a multimedia content included in the multimedia content message or a content segment which is a part of the multimedia content, the multimedia content message includes a header including a protocol version and a message ID, a management container including multimedia content message (MCM) management and multimedia content dissemination (MCD) protocol related information, a situation container including information for describing an event, a location container including location information of the event, and a multimedia content container including the multimedia content, and the management container includes multimedia data unit number (numberOfMultimediaUnit) information which indicates the number of multimedia data units included in the multimedia container and multimedia format type (multimediaFormat- Type) information regarding the multimedia content included in the multimedia container.

The MCD protocol of the present invention describes information regarding road safety, traffic management, point of interest (POI), national patrimony, commercial, personal, etc. as multimedia contents to enable V2X communication. In addition, the MCD protocol of the present invention separates the multimedia contents into a plurality of segments and propagates them, and merges the segments at a receiving end to recover the multimedia contents.

By transmitting an MCM that includes size information, the receiver may determine whether to forward or ignore the MCM delivering the multimedia contents/segments based on a storage state. Therefore, unnecessary reception processing and storage waste may be prevented.

By transmitting an MCM containing multimedia content identification information (file name, URI, and MD5), the receiver may determine whether a received content is a duplicated multimedia content and decide whether to deliver or ignore the corresponding content/segment to an application. Therefore, the unnecessary reception processing and the storage waste may be prevented.

By transmitting an MCM containing URL information, the multimedia content may be forwarded based on another access layer or transport layer technology. In this case, it is possible to minimize the use of a V2X communication frequency by transmission of the multimedia content.

By transmitting an MCM that includes language information, the receiver may determine whether the multimedia content may be permitted to a user and decide whether to forward or ignore the corresponding content/segment to the application. Therefore, the unnecessary reception processing and the storage waste may be prevented.

By transmitting an MCM that includes valid time information, the receiver may determine a validity time of the multimedia content and decide whether to forward or ignore the corresponding content/segment to the application. Therefore, the unnecessary reception processing, the storage waste, and utilization of ineffective information may be prevented.

DESCRIPTION OF DRAWINGS

The accompanying drawings, which are included to provide a further understanding of the present invention and are incorporated in and constitute a part of this application, illustrate embodiments of the present invention together with the detailed description serving to describe the principle of the present invention.

The accompanying drawings, which are included to provide a further understanding of the present invention and are incorporated in and constitute a part of this application, illustrate embodiments of the present invention together with the detailed description serving to describe the principle of the present invention.

DETAILED DESCRIPTION OF THE EMBODIMENTS

Preferred embodiments of the present invention are described in detail and examples thereof are illustrated in the accompanying drawings. The following detailed description with reference to the accompanying drawings is intended to illustrate the preferred embodiments of the present invention rather than merely illustrating embodiments that may be implemented according to embodiments of the present invention. The following detailed description includes details in order to provide a thorough understanding of the present invention, but the present invention does not require all of these details. In the present invention, respective embodiments described below need not be particularly used separately. Multiple embodiments or all embodiments may be together used and specific embodiments may be used as a combination.

Most of the terms used in the present invention are selected from the general ones that are widely used in the field, but some terms are arbitrarily selected by the applicant and the meaning thereof will be described in detail in the following description as necessary. Accordingly, the invention should be understood based on the intended meaning of the term rather than the mere name or meaning of the term.

The present invention relates to a V2X communication apparatus and the V2X communication apparatus is included in an Intelligent Transport System (ITS) to perform all or some functions of the ITS. The V2X communication apparatus may communicate with vehicles and vehicles, vehicles and infrastructure, vehicles and bicycles, and mobile devices. The V2X communication apparatus may be abbreviated as a V2X apparatus. As an embodiment, the V2X apparatus may correspond to an on board unit (OBU) of the vehicle or may be included in the OBU. The OBU may also be referred to as on a board equipment (OBE). The V2X apparatus may correspond to a road side unit (RSU) of the infrastructure or may be included in the RSU. The RSU may also be referred to as a road side equipment (RSE). Alternatively, the V2X communication apparatus may correspond to an ITS station or may be included in the ITS station. All of a predetermined OBU, a predetermined RSU, and a predetermined mobile equipment that perform V2X communication may also be referred to as the ITS station or the V2X communication apparatus.

Figure 1:
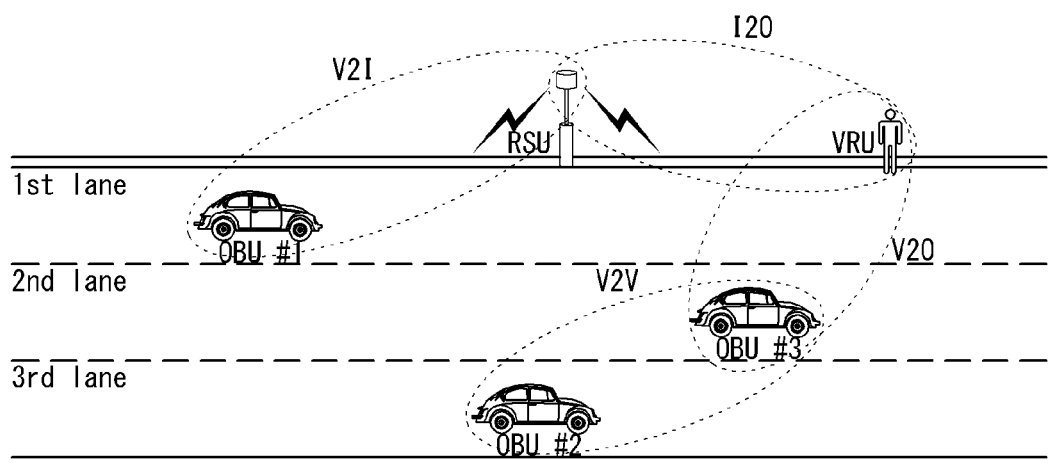
FIG. 1 illustrates an intelligent transport system (ITS) according to an embodiment of the present invention.

FIG. 1 illustrates an intelligent transport system (ITS) according to an embodiment of the present invention.

The intelligent transport system means a system that provides an efficient and safe transport service by applying information and communication technology such as an electronic control and communication device to transportation means such as automobiles, buses, trains, or the like and transportation facilities including traffic lights, an electronic display board, and the like. In order to support the ITS, vehicle to everything (V2X) technology may be used. V2X communication technology represents communication technology between vehicles or between the vehicle and a peripheral device.

A vehicle that supports V2X communication is equipped with the OBU and the OBU includes a dedicated short-range communication (DSRC) communication modem. An infra-structure including a V2X module installed around a road, such as the traffic light, may be referred to as an RSU. Vulnerable road users (VRUs) are transportation weakness and pedestrians, bicycles, wheelchairs, etc. may correspond to the VRUs. The VRU may perform V2X communication.

Vehicle to vehicle (V2V) refers to inter-vehicle communication or communication technology including a V2X communication apparatus. Vehicle to infra-structure (V2I) refers to communication or communication technology between the vehicle and an infra-structure including the V2X communication apparatus. Besides, communication between the vehicle and the transportation weakness may refer to V2O and communication between the infra-structure and the transportation weakness may refer to I2O.

Figure 2:
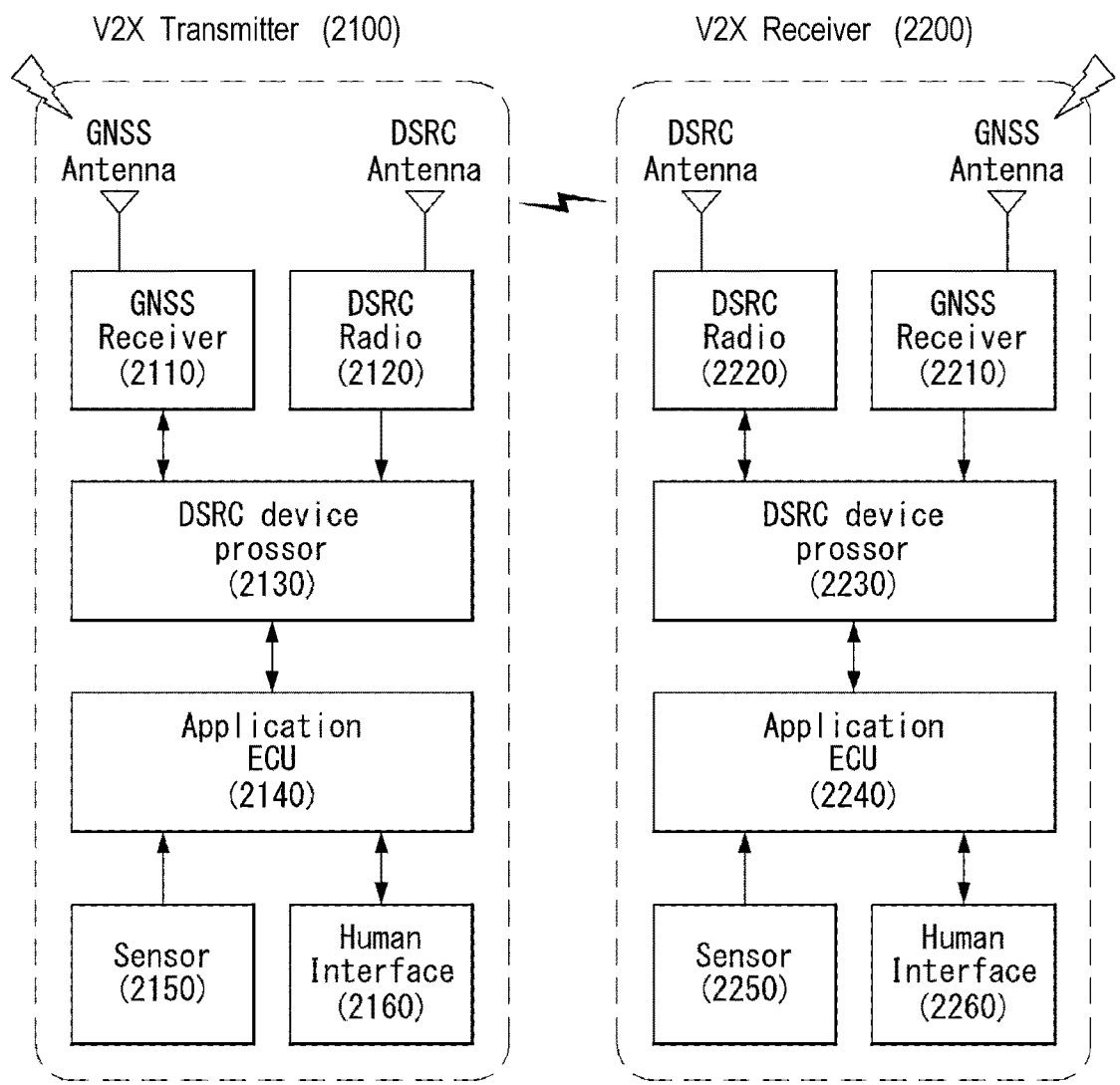
FIG. 2 illustrates a V2X transmission/reception system according to an embodiment of the present invention.

FIG. 2 illustrates a V2X transmission/reception system according to an embodiment of the present invention.

A V2X transmission/reception system includes a V2X transmitter 2100 and a V2X receiver 2200 and the transmitter and the receiver are distinguished from each other according to roles of transmitting and receiving data and are not different from each other in a configuration of a device. The V2X transmitter 2100 and the V2X receiver 2200 are both the V2X communication apparatuses.

The V2X transmitter 2100 includes a Global Navigation Satellite System (GNSS) receiver 2110, a DSRC radio 2120, a DSRC device processor 2130, an application Electronic Control Unit (ECU) 2140, a sensor 2150, and a human interface 2160.

The DSRC radio 2120 may perform communications based on the IEEE 802.11 standard based on a Wireless Local Area Network (WLAN) and/or the Wireless Access in Vehicular Environments (WAVE) standard of the Society of Automotive Engineers (SAE). The DSRC radio 2120 may perform operations of a physical layer and an MAC layer.

The DSRC device processor 2130 may decode a message received by the DSRC radio 2120 or decode a message to be transmitted. The GNSS receiver 2110 may process GNSS and acquire positional information and temporal information. As an example, the GNSS receiver 2110 may become a Global Positioning System (GPS) device.

The application ECU 2140 may be a microprocessor for providing a specific application service. The application ECU may generate an operation/message based on sensor information and a user input in order to provide a service and transmit/receive the message by using the DSRC device processor. The sensor 2150 may obtain vehicle status and ambient sensor information. The human interface 2160 may receive a user's input or display/provide the message through an interface such as an input button or a monitor.

The V2X receiver 2200 includes a Global Navigation Satellite System (GNSS) receiver 2210, a DSRC radio 2220, a DSRC device processor 2230, an application Electronic Control Unit (ECU) 2240, a sensor 2250, and a human interface 2260. The aforementioned description of the configuration of the V2X transmitter 2100 is applied to the configuration of the V2X receiver 2200.

The DSRC radio and the DSRC device processor correspond to one embodiment of a communication unit. The communication unit may perform communication based on cellular communication technology such as 3GPP and Long Term Evolution (LTE).

Figure 3:
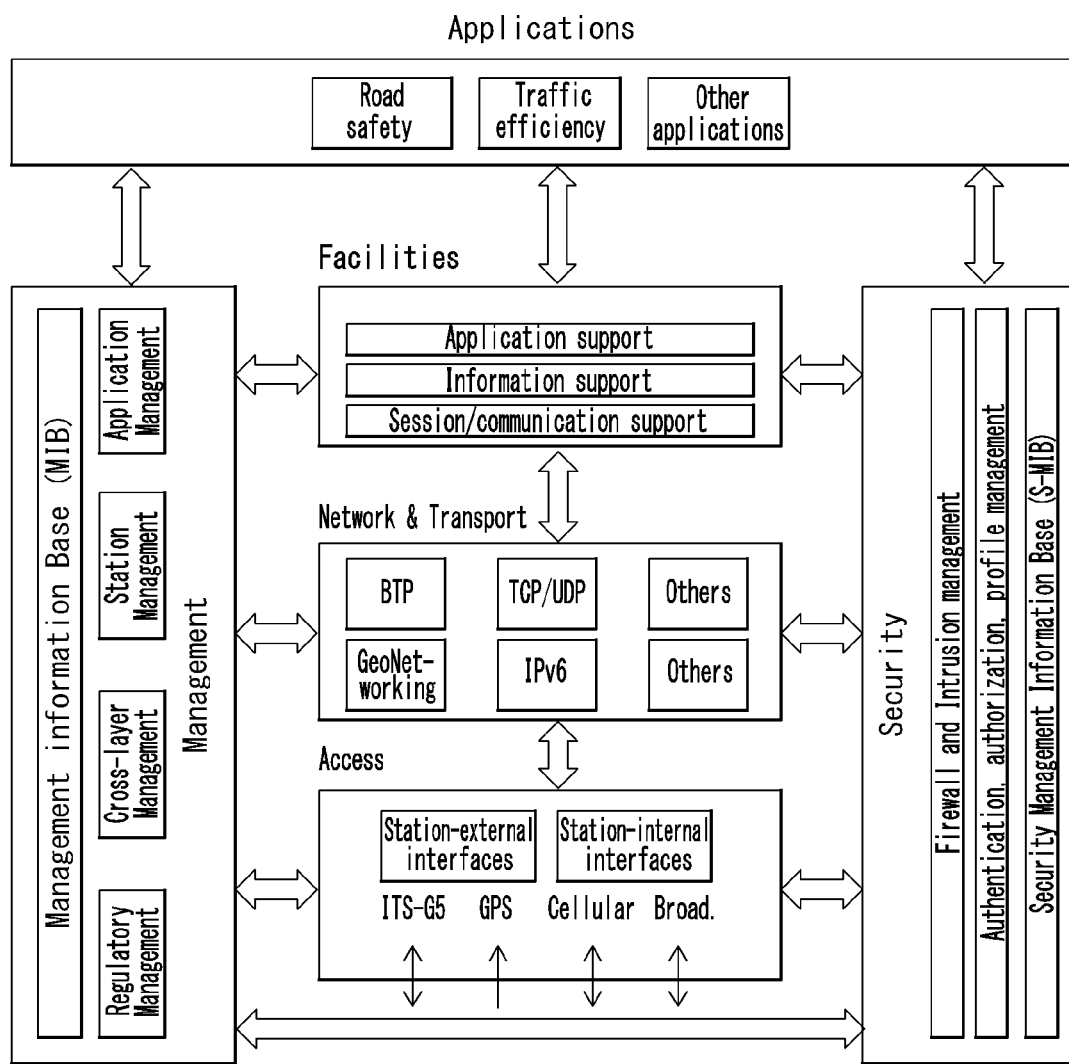
FIG. 3 illustrates a configuration of a V2X system according to an embodiment of the present invention.

FIG. 3 illustrates a configuration of a V2X system according to an embodiment of the present invention.

As an embodiment, the V2X system of FIG. 3 may correspond to an ITS station reference architecture defined in ISO 21217/EN302 665. In FIG. 3, the ITS station illustrates an example of an ITS station based on a reference architecture. FIG. 3 illustrates a hierarchical architecture for end-to-end communication. When a vehicle-to-vehicle message is communicated, the message is passed through each layer one layer down in a transmitting vehicle/ITS system and the message is delivered to an upper layer one layer up in a receiving vehicle/ITS system. The description of each layer is as follows.

Application layer: The application layer may implement and support various use cases. For example, an application may provide road safety, efficient traffic information, and other application information.

The application layer may classify and define the ITS application and provide an end vehicle/user/infra-structure through the lower layer. The application may be defined/applied for each user case or the use-case may be grouped and defined/applied like the road safety, traffic efficiency, a local service, and infotainment. As an embodiment, application classification, the use-case, and the like may be updated when a new application scenario is generated. Layer management may manage and serve information related to an operation and a security of the application layer. The information and the service may be bidirectionally delivered and shared through an interface between MAMA (management entity and application layer and SA (interface between security entity and ITS-S applications) or service access point (SAP) (e.g., MA-SAP and SA-SAP). A request from the application layer to a facility layer or information delivery from the facility layer to the application layer may be performed through FA (interface between facilities layer and ITS-S applications) (or FA-SAP).

Facilities layer: The facility layer may support various use-cases defined in the application layer so as to effectively implement various use-cases. For example, the facility layer may perform application support, information support, and session/communication support.

The facility layer may basically support functions of a session layer, a presentation layer, and an application layer which are top three layers. The facility layer may additionally provide evolved facilities such as the application support, the information support, and the session/communication support for the ITS system. The facility means a component that provides functionality, information, and data.

The facilities may be classified into a common facility and a domain facility. The common facility may provide a core service or function required for a basic application set of the ITS and an operation of the ITS station. For example, time management, position management, service management, and the like may be provided. The domain facility may provide a special service or function to the basic application set of one or plural ITSs. For example, the domain facility may provide DEcentralized Notification Messages (DENM) management for Road Hazard Warning applications (RHW). When the domain facility as an optional function is not supported by the ITS station, the domain facility may not be used.

Networking & Transport layer: The network/transport layer may configure a network for vehicle communication between homogeneous/heterogeneous networks by using various transport protocols and network protocols. For example, the networking/transport layer may provide Internet connection and routing using an Internet protocol such as TCP/UDP+IPv6 or the like. Alternatively, the networking/transport layer may configure a vehicle network by using a geographical position based protocol such as a basic transport protocol (BTP)/geonetworking.

The transport layer corresponds to a connection layer between services providing upper layers (session layer, presentation layer, and application layer) and lower layers (network layer, data link layer, and physical layer). The transport layer serves to manage data sent by a user to accurately arrive at a destination. At a transmitting side, the transport layer may serve to split data into packets having an appropriate size for transmission for efficient data transmission. At a receiving side, the transport layer may serve to recombine the received packets into an original file. As an embodiment, the transport protocol may adopt TCP/UDP and a transport protocol for ITS such as VTS may be used.

The network layer may allocate a logical address and decide a packet transfer path. The network layer may receive a packet generated by the transport layer and add a network header including the logical address of the destination. As an example of a packet path design, unicast/broadcast may be considered between the vehicles, between the vehicle and a fixation station, and between fixation stations. As an embodiment, as the network protocol for the ITS, a protocol such as geo-networking, IPv6 networking with mobility support, IPv6 over geo-networking, or the like may be considered.

Access layer: The access layer may transmit messages/data received by the upper layer through a physical channel. For example, the access layer may perform/support data communication based on IEEE 802.11 and/or 802.11p standard-based communication technology, ITS-G5 wireless communication technology based on physical transmission technology of the IEEE 802.11 and/or 802.11p standards, 2G/3G/4G (LTE)/5G wireless cellular communication technology including satellite/broadband wireless mobile communication, broadband terrestrial digital broadcasting technology such as DVB-T/T2/ATSC, GPS technology, IEEE 1609 WAVE technology, and the like.

The ITS system for vehicle communication and networking may be organically designed in consideration of various access technologies, network protocols, and communication interfaces for providing various use-cases. Further, the role and the function of each layer may be enhanced or reinforced.

Figure 4:
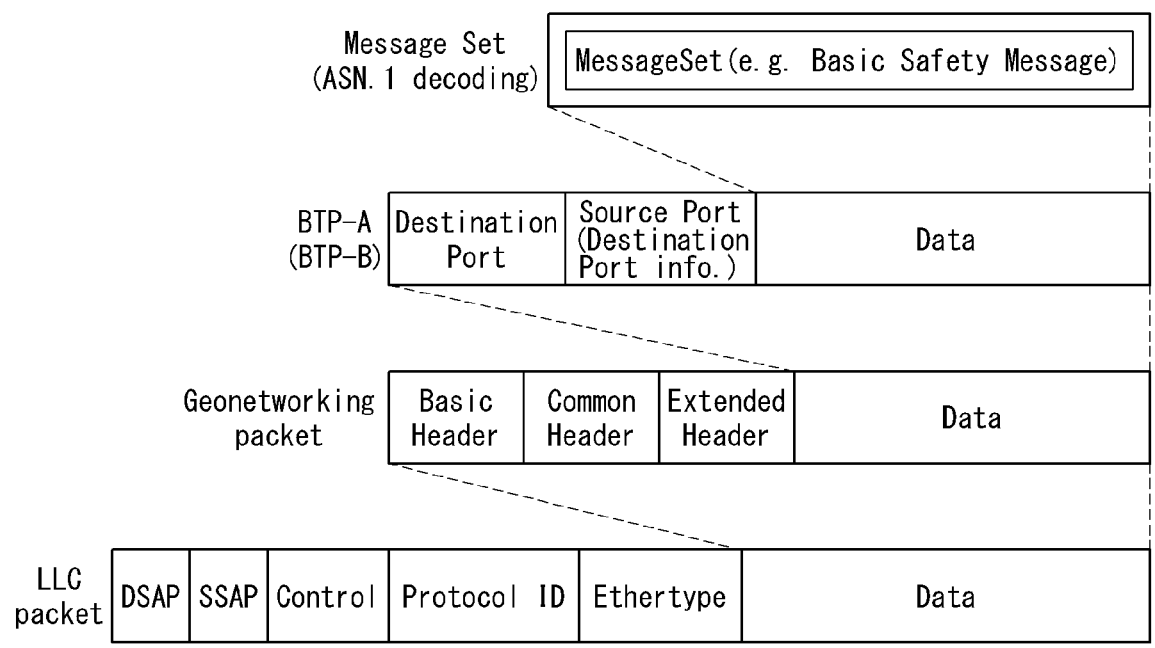
FIG. 4 illustrates a packet structure of a network/transport layer according to an embodiment of the present invention.

FIG. 4 illustrates a packet structure of a network/transport layer according to an embodiment of the present invention.

FIG. 4 illustrates a packet structure of the network/transport layer, and the transport layer may generate a BTP packet and the network layer may generate a geo-networking packet. The geo-networking packet corresponds to data of a logical link control (LLC) packet to be included in the LLC packet. The geo-networking packet may be encapsulated into the LLC packet. In an embodiment of FIG. 4, the data may include a message set and the message set may become a basic safety message.

The BTP is a protocol for transmitting the message such as the CAM or DENM generated by the facility layer to the lower layer. The BTP header is constituted by A type and B type. An A type BTP header may include a destination port and a source port required for transmission/reception for interactive packet transmission. A B type BTP header may include the destination port and destination port information required for transmission for non-interactive packet transmission. The description of a field/information included in the header is as follows.

Destination port: The destination port identifies a facility entity corresponding to the destination of data (BTP-PDU) included in the BTP packet.

Source port: as a field generated in the case of BTP-A type, indicates a port of a protocol entity of the facility layer in a source in which the corresponding packet is transmitted. This field may have a size of 16 bits.

Destination port Information: as a field generated in the case of BTP-B type, may provide additional information when the destination port is a most well known port. This field may have the size of 16 bits.

The geo-networking packet includes a basic header and a common header according to the protocol of the network layer and optionally includes an extension header according to a geo-networking mode.

The basic header may be 32 bits (4 bytes). The basic header may include at least one of a version field, a next header (NH) field, a lifetime (LT) field, and a remaining hop limit (RHL) field. The description of the fields included in the basic header is as follows. A bit size configuring each field is just an embodiment and may be modified.

Version (4 bits): A version field indicates a version of the geo-networking protocol.

NH (4 bits): A next header (NH) field indicates a type of subsequent header/field. When a field value is 1, the common header may be followed and when the field value is 2, a secured packet in which the security is configured may be followed.

LT (8 bits): A lifetime (LT) field indicates a maximum survival time of the corresponding packet.

RHL (8 bits): A remaining hop limit (RHL) field indicates a remaining hop limit. An RHL field value may be reduced by one for each forwarding on a GeoAdhoc router. When the RHL field value is 0, the corresponding packet is not forwarded any longer.

The common header may be 64 bits (8 bytes). The common header may include at least one of a next header (NH) field, a header type (HT) field, a header sub-type (HST) field, a header sub-type (HST) field, a traffic class (TC) field, a flags field, a payload length (PL) field, and a maximum hop limit (MHL) field. The description of each of the fields is as follows.

NH (4 bits): The next header (NH) field indicates the type of subsequent header/field. When the field value is 0, the NH field may indicate "ANY" type which is not defined, when the field value is 1, the NH field may indicate a BTP-A type packet, when the field value is 2, the NH field may indicate a BTP-B type, and when the field value is 3, the NH field may indicate an IP diagram of IPv6.

HT (4 bits): The header type field indicates a geo-networking type. The geo-networking type includes Beacon, GeoUnicast, GeoAnycast, GeoBroadcast, Topologically-Scoped Broadcast (TSB), and Location Service (LS).

HST (4 bits): The header sub type field indicates a detailed type together with the header type. As an embodiment, when the HT type is set to the TSB, the HST may indicate a single hop for the HST value of '0' and a multi-hop for the HST value of '1'.

TC (8 bits): The traffic class field may include Store-Carry-Forward (SCF), channel offload, and TC ID. The SCF field indicates whether to store the packet when there is no neighbor to which the packet is to be transferred. The channel offload field indicates that the packet may be transferred to another channel in the case of a multi-channel operation. The TC ID field as a value allocated when transferring the packet in the facility layer may be used for setting a contention window value in the physical layer.

Flag (8 bits): The flag field indicates whether the ITS apparatus is mobile or stationary and as an embodiment, the flag field may become last 1 bit.

PL (8 bits): The payload length field indicates a data length subsequent to the geo-networking header in units of bytes. For example, in the case of the geo-networking packet that carries the CAM, the PL field may indicate the BTP header and the length of the CAM.

MHL (8 bits): The Maximum Hop Limit (MHL) field may indicate a maximum hopping number.

The LLC header is added to the geo-networking packet to generate the LLC packet. The LLC header provides a function to distinguish and transmit IP data from geo-networking data. The IP data and the geo-networking data may be distinguished by Ethertype of SNAP. As an embodiment, when the IP data is transmitted, the Ethertype may be set to 0x86DD and included in the LLC header. As an embodiment, when the geo-networking data is transmitted, the Ethertype may be set to 0x86DC and included in the LLC header. The receiver may verify the Ethertype field of the LLC packet header and forward and process the packet to an IP data path or a geo networking path according to the value.

Figure 5:
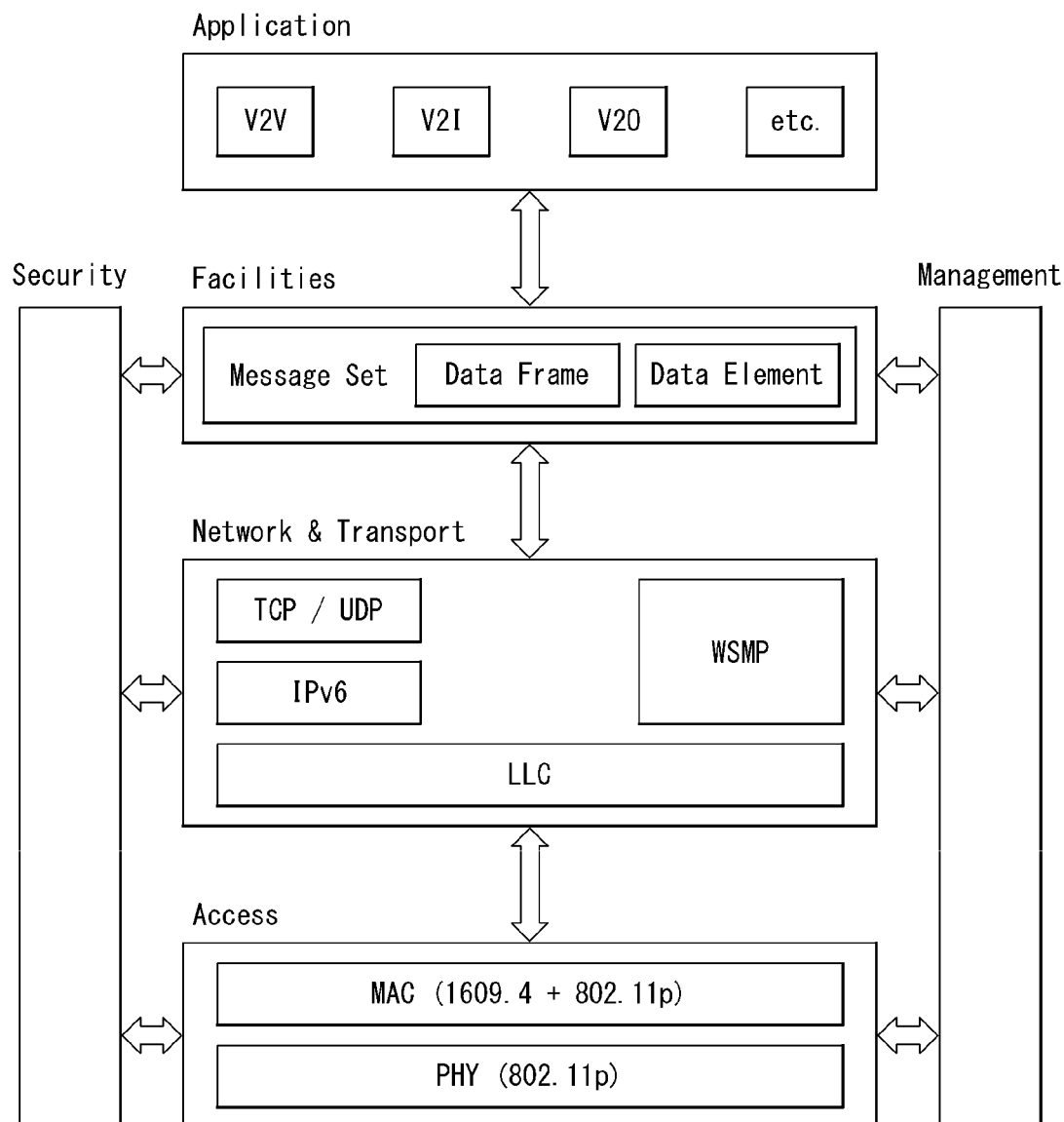
FIG. 5 illustrates a configuration of a V2X system according to another embodiment of the present invention.

FIG. 5 illustrates a configuration of a V2X system according to another embodiment of the present invention.

FIG. 5 illustrates a hierarchical architecture corresponding to another embodiment of the V2X system of FIG. 3. As an embodiment, the North American V2X system uses IEEE 802.11 PHY technology and MAC technology, and further may use the MAC technology of IEEE 1609.4. In the network/transport layer technology, the technology of the IEEE802.2 standard may be applied to an LLC block and the IEEE 1609.3 technology may be applied to a WAVE short message protocol (WSMP). The facility layer may use a message set of a J2735 standard of SAE and the application layer may use an application defined for V2V, V2I, and V2O in a J2945 standard.

The application layer may perform a function to implement and support the use-case. The application may be optionally used according to the use-case. A system requirement of each use-case may be defined in the J2945 standard. J2945/1 defines an application of V2V technology such as V2V safety communication.

A J2945/1 document defines applications including emergency electronic brake lights (EEBL), forward crash warning (FCW), blind spot warning (BSW), lane change warning (LCW), intersection movement assist (IMA), and control loss warning (CLW). As an embodiment, FCW technology is V2V safety communication technology that warns of a collision with a preceding vehicle. When a vehicle equipped with the V2X communication apparatus makes emergency stop or crashes, an FCW safety message may be transmitted in order to prevent a collision of a subsequent vehicle. The subsequent vehicle may receive FCW messages and alert a driver or perform such controls as speed deceleration or lane change. In particular, even when there is another vehicle between a stopped vehicle and a driving vehicle, it is possible to determine a state of the stopped through the FCW. The FCW safety message may include positional information (latitude, longitude, and lane) of the vehicle, vehicle information (vehicle type, length, direction, speed), and event information (stop, sudden stop, and slow down) and the information may be generated by the request of the facility layer.

The facility layer may correspond to OSI layer 5 (session layer), layer 6 (presentation layer), or layer 7 (application layer). The facility layer may generate the message set according to a situation in order to support the application. The message set may be defined in the J2735 standard and described/decoded through ASN.1. The message set may include a BasicSafetyMessage message, a MapData message, an SPAT message, CommonSafetyRequest message, an EmergencyVehicleAlert message, an IntersectionCollision message, a ProbeVehicleData message, a RoadSideAlert message, and a PersonalSafetyMessag message.

The facility layer collects the information to be transmitted from the upper layer to generate the message set. The message set may be displayed in an Abstract Syntax Notation 1 (ASN.1) scheme. The ASN.1 as a notation used to describe the data structure may also set an encoding/decoding rule. The ASN.1 does not depend on specific devices, a data representation scheme, programming languages, hardware platforms, and so on. The ASN.1 as a language for describing data regardless of platform is a joint standard between Consultative Committee on International Telegraphy and Telephony (CCITT) X.208 and International Organization for Standardization, (ISO) 8824.

The message set as a collection of messages related to V2X operations and there is a message set appropriate to the context of the upper application. The message set may be expressed in a format of the data frame and may include at least one element. Each element may include the data frame or a data element.

The data frame represents two or more data sequences. The data frame may become a sequence structure of the data element or a sequence structure of the data frame. As an embodiment, DV_vehicleData as a data frame structure representing information of a vehicle may include a plurality of data elements (for example, Height, Bumbers, mass, and trailerweight). The data element defines a description of the data element. As an embodiment, an element called Height used in the data frame is defined in DE_VehicleHeight and may express a height of the vehicle. As an embodiment, the height of the vehicle may be expressed from 0 to 127, and an LBS unit may be increased by 5 cm and be expressed up to 6.35 meters.

As an embodiment, a basic safety message (BasicSafetyMessage) may be transmitted. The BasicSafetyMessage as a most basic and important message in the message set is used for periodically transmitting basic information of the vehicle. The corresponding message may include coreData defined as BSMcoreData, Part II which is optional, and regional data. The coreData may include data elements including msgCnt, id, lat, long, elev, speed, deading, break, size, and the like. The coreData uses the data elements to display a message count, ID, latitude, longitude, altitude, speed, direction, a brake, a vehicle size, and so on. The corresponding BSM may generally transmit information corresponding to the coreData in a period of 100 msec (10 times per second).

The network/transport layer may correspond to OSI layer 3 (network layer) and layer 4 (transport layer). A WAVE short message protocol (WSMP) may be used for transmitting a WAVE Short Message (WSM) delivered by the upper layer. Additionally, an IPv6/TCP may be used for processing an IP signal in the related art. The LLC block may adopt the IEEE 802.2 standard and may distinguish IP diagrams from WSM packets.

The access layer may correspond to OSI layer 1 (physical layer) and OSI layer 2 (data link layer). The access layer may use PHY technology and MAC technology of IEEE 802.11 and additionally use MAC technology of IEEE 1609.4 in order to support vehicle communication.

The security entity and the management entity may be connected and operated in all intervals.

Figure 6:
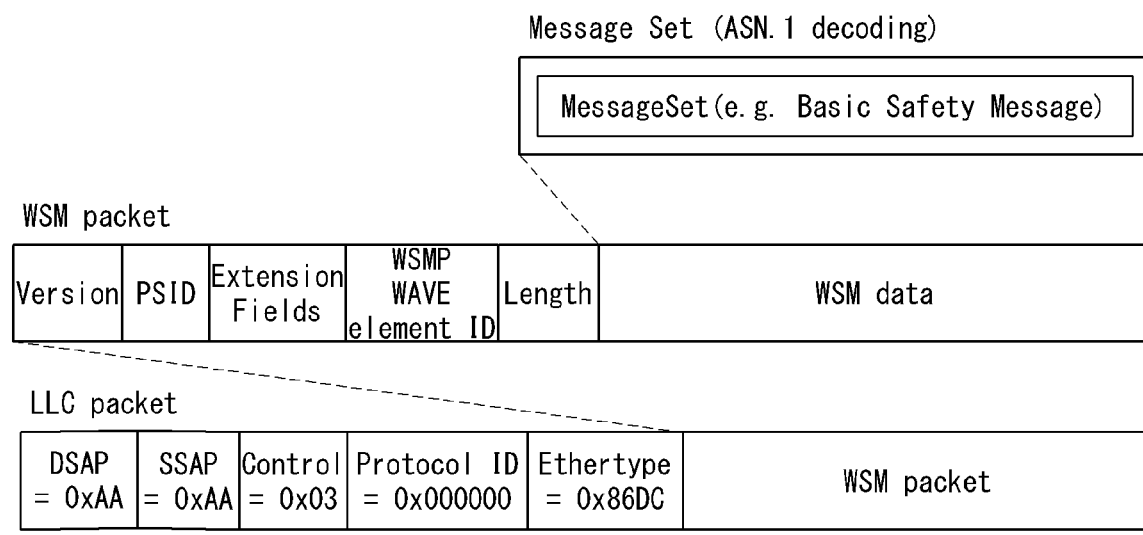
FIG. 6 illustrates a WSMP packet configuration according to an embodiment of the present invention.

FIG. 6 illustrates a WSMP packet configuration according to an embodiment of the present invention.

The network/transport layer of FIG. 5 may transmit a vehicle security message such as the BSM via the WSMP. The WSMP is described in an IEEE 1609.3 document and may also support the Ipv6 and the TCP/UDP in order to additionally transmit the IP data.

The WSMP is a protocol for delivering the WAVE short message generated in the ASN.1 scheme in the facility layer to the lower layer. As illustrated in FIG. 6, the WSMP packet includes the WSMP header and the WSM data including the message. The WSMP header includes a version field, a PSID field, an extension field, a WSM WAVE element ID field, and a length field.

The version field may be defined as a Wsmp Version field indicating an actual WSMP version of 4 bits and a reserved field of 4 bits. The PSID field as a provider service identifier may be allocated according to the application in the upper layer. The PSID field helps deciding an appropriate upper layer at the receiver side. The extension field is a field for extending the WSMP header and information including a channel number, data rate, transmit power used, and the like may be inserted into the extension field. The WSMP WAVE element ID field may designate a type of transmitted WAVE short message. The length field may designate a length of the WSM data transmitted through a WSMLength field of 12 bits in units of octets.

The LLC header provides a function to distinguish and transmit the IP data from the WSMP data. The IP data and the WSMP data may be distinguished by Ethertype of SNAP. As an embodiment, the LLC header and SNAP header structures may be defined in the IEEE 802.2 document. As an embodiment, when the IP data is transmitted, the Ethertype may be set to 0x86DD and included in the LLC header. As an embodiment, when the WSMP data is transmitted, the Ethertype may be set to 0x86DC and included in the LLC header. The receiver may verify the Ethertype field of the LLC packet header and forward and process the packet to an IP data path or a WSMP path according to the value.

Figure 7:
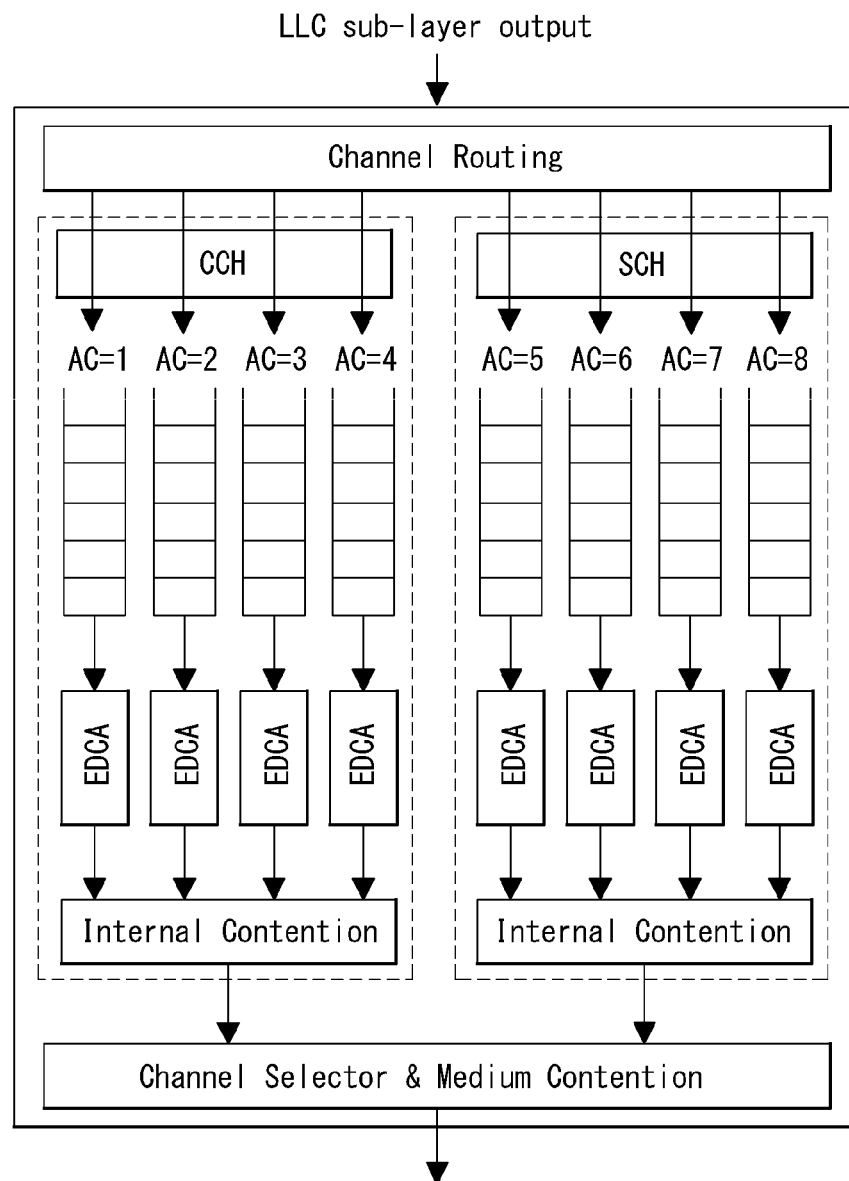
FIG. 7 illustrates a conceptual internal architecture of an MAC sublayer performing a multi-channel operation (MCO) according to an embodiment of the present invention.

FIG. 7 illustrates a conceptual internal architecture of an MAC sublayer performing a multi-channel operation (MCO) according to an embodiment of the present invention.

As an embodiment, the architecture of FIG. 7 may be included in the access layer of FIG. 5 or included in the MAC layer of the access layer. The MCO structure of FIG. 7 may include channel coordination in which a channel access is defined, channel routing in which operation processes of overall data and a management frame between PHY-MAC layers are defined, Enhanced Dedicated Channel Access (EDCA) of deciding and defining the priority of the transmission frame and a data buffer (or queue) storing the frame received by the upper layer. A channel coordination block is not illustrated in FIG. 7 and the channel coordination may be performed by the entirety of an MAC sublayer of FIG. 5.

Channel coordination: As an embodiment, channel accesses to a control channel (CCH) and a service channel (SCH) may be controlled. A channel access coordination will be described below. As an embodiment, the Wave short message (WSM) may be transmitted as (via) the CCH and the WSM and/or IP data may be transmitted as the SCH.

Data buffer (queue): The data buffer may store the data frame received from the upper layer according to defined access category (AC). In the embodiment of FIG. 3, the data buffer may be provided for each AC.

Channel routing: A channel routing block may deliver data input in the upper layer to the data buffer. Transmission operation parameters such as the channel number, the transmit power, and the data rate for the channel coordination and the frame transmission may be called with respect to a transmission request of the upper layer.

EDCA: As a scheme for guaranteeing QoS in the IEEE 802.11e MAC layer in the related art is a contention based medium access scheme that divides the AC into four access categories (AC) according to a type of traffic and assigns different priorities for each category and allocates different parameters for each AC and gives more transmission opportunities to traffic having a higher priority. An EDCA block may designate 8 priorities of 0 to 7 for data transmission including the priority and data which reach the MAC layer may be mapped to four ACs according to the priority.

Figure 8:
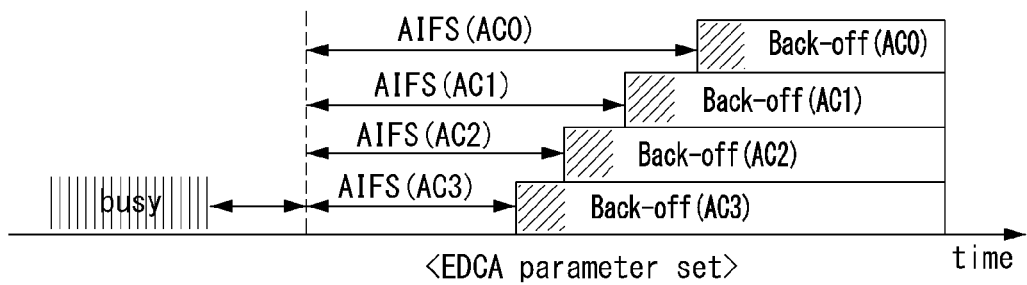
FIG. 8 illustrates a relationship between a user priority of EDCA and access category (AC) according to an embodiment of the present invention.

FIG. 8 illustrates a relationship between a user priority of EDCA and access category (AC) according to an embodiment of the present invention.

A relationship between a user priority of the EDCA and the AC is illustrated in FIG. 8. In FIG. 8, as an AC number is larger, a rank has a higher priority. Every AC has a transmission queue and an AC parameter thereof and the difference in AC priority is decided based on the AC parameter values set differently from each other. The AC parameter values set differently from each other are connected with back-off to have different channel access priorities. The corresponding AC parameter values adopt AIFS [AC], CWmin[AC], and CWmax[AC], respectively and here, an arbitration inter-frame space (AIFS) refers to a minimum time for verifying whether the channel is idle before performing transmission. The lower the value of AIFS [AC] and CWmin [AC] is, the higher the priority is, and accordingly, the channel access delay is shortened so that more bandwidth may be used in a given traffic environment.

When a collision between stations occurs during transmitting the frame, the transmitter generates a new back-off counter. Transmission queues for four ACs defined in the IEEE 802.11 MAC individually compete with each other for radio medium access in one station. Since the respective ACs have back-off counters which are independent from each other, a virtual collision may occur. When there are two or more ACs that simultaneously complete the back-off, data of an AC having a highest priority is first transmitted and other ACs update the back-off counter again by increasing a CW value. Such a collision resolution process is referred to as a virtual collision process. Further, the EDCA allows the channel to be accessed during data transmission through a transmission opportunity (TXOP). When one frame is too long and may not be transmitted during one TXOP, one frame may be divided into small frames and transmitted.

Figure 9:
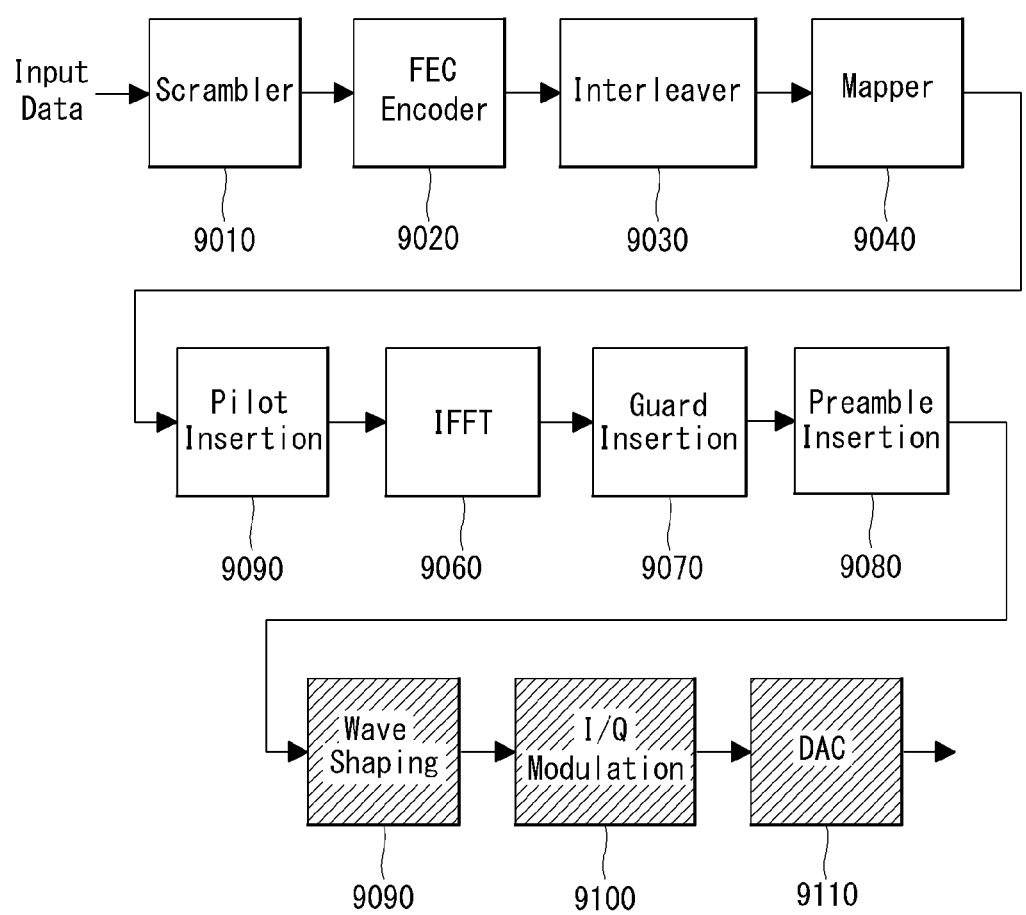
FIG. 9 illustrates a physical layer configuration of a V2X transmitting apparatus according to an embodiment of the present invention.

FIG. 9 illustrates a physical layer configuration of a V2X transmitting apparatus according to an embodiment of the present invention.

As an embodiment, FIG. 9 illustrates a block diagram of physical layer signal processing of IEEE 802.11 or ITS-G5. However, FIG. 9 illustrates a physical layer configuration according to an embodiment of the present invention, and is not limitedly applied only to the aforementioned transmission standard technology.

The physical layer processor of FIG. 9 may include a physical layer convergence protocol (PLCP) sublayer baseband signal processing part including at least one of a scrambler 9010, an FEC encoder 9020, an interleaver 9030, a mapper 9040, a pilot insertion block 9050, an IFFT block 9060, a guard insertion block 9070, and a preamble insertion block 9080 and a physical medium dependent (PMD) sublayer RF band signal processing part including at least one of a wave shaping 9090, an I/Q modulation block 9100, and a DAC 9110. The description of a function of each block is as follows.

The scrambler 9010 XORs an input bitstream with a pseudo random binary sequence (PRBS) to randomize the input bitstream. The FEC encoder 9020 may add redundancy to the transmission data so as to correct an error on a transmission channel at the receiving side. The interleaver 9030 may interleave input data/bitstreams based on an interleaving rule so as to cope with a burst error. As an embodiment, when deep facing when deep fading or erasure is applied to a QAM symbol, since interleaved bits are mapped to each QAM symbol, it is possible to prevent an error from occurring consecutive bits among all codeword bits. The mapper 9040 may allocate input bit words to one constellation. The pilot insertion block 9050 inserts a reference signal into a predetermined location of a signal block. By using such a reference signal, the receiver may estimate a channel distortion phenomenon such as channel estimation, frequency offset, and timing offset.

The IFFT block 9060, that is, an inverse waveform transform block, may convert an input signal so as to enhance transmission efficiency and flexibility in consideration of the characteristics of the transmission channel and a system structure. As an embodiment, in the case of an OFDM system, the IFFT block 9060 may convert a signal in a frequency domain into a time domain by using an inverse FFT operation. In the case of a single carrier system, the IFFT block 9060 may not be used or may be omitted. The guard insertion block 9070 may insert a guard interval between adjacent signal blocks in order to minimize an influence of delay spread of the transmission channel. As an embodiment, in the case of the OFDM system, the guard insertion block 9070 may insert a cyclic prefix into the guard interval period. The preamble insertion block 9080 may insert a signal of a determined type, i.e., a preamble, into the transmission signal between the transmitter and receiver so that the receiver may quickly and efficiently detect a target signal. As an embodiment, in the case of the OFDM system, the preamble insertion block 9080 may define a signal block/signal frame including a plurality of OFDM symbols and insert a preamble symbol into a start portion of the signal block/signal frame.

The wave shaping block 90090 may waveform process an input baseband signal based on channel transmission characteristics. As an embodiment, the waveform shaping block 9090 may perform square-root-raised cosine (SRRC) filtering to obtain a base of out-of-band emission of a transmitted signal. In the case of a multi-carrier system, the waveform shaping block 9090 may not be used or may be omitted. The I/Q modulator 9100 may perform in-phase and quadrature modulation. A digital to analog converter (DAC) 9110 block may convert an input digital signal into an analog signal and output the analog signal. An output analog signal may be transmitted through an output antenna.

Respective blocks described in FIG. 9 may be omitted or may be replaced with other blocks having similar or equivalent functions. The blocks in FIG. 9 may be configured as a whole or a combination of some parts as needed. In this specification, the V2X communication apparatus may communicate based on the DSRC technology and the WAVE technology described in FIGS. 7 to 9. However, the V2X communication apparatus may perform communication based on other communication technologies including cellular technologies such as LTE, LTE-A, and 5G.

Hereinafter, a multimedia content dissemination (MCD) service will be described.

An MCD basic service is a V2X technology that describes information regarding road safety, traffic management, point of interest (POI), national patrimony, commercial, personal, etc. as multimedia contents. A vehicle ITS-S or a roadside ITS-S may transmit a multimedia content message (MCM) to another vehicle ITS station or roadside ITS station. The ITS station may transmit the MCM in a broadcast, geographical broadcast, multicast or peer-to-peer scheme. A series of processes and rules for transmitting an MCM may be referred to as an MCD protocol.

Figure 10:
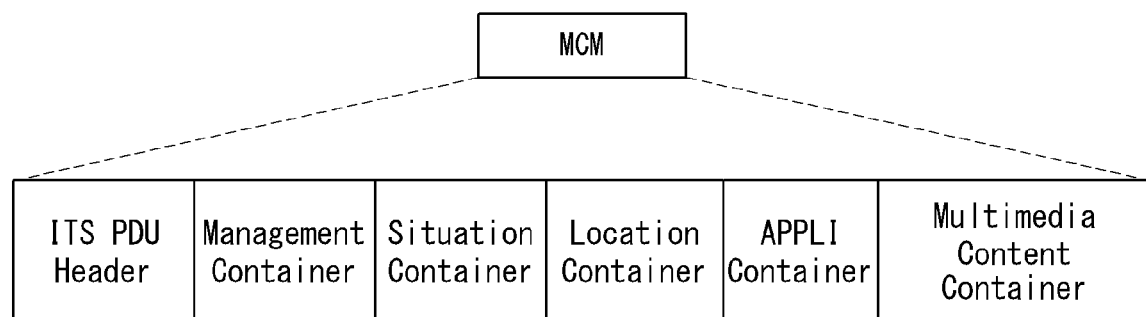
FIG. 10 illustrates an MAM format according to an embodiment of the present invention.

FIG. 10 illustrates an MAM format according to an embodiment of the present invention.

The MCM is a message for describing a specific event as the multimedia content. The MCM includes an ITS PDU header, a management container, a situation container, a location/location container, an application container (APPIL container), and a multimedia content container.

The ITS PDU header includes at least one of protocol version information, message type information, and ITS station ID information. The management container contains information related to the management of the MCM and the MCD protocol. The situation container contains information related to a triggering source of the MCD. The situation container may provide information regarding a kind of the event and a type of event. The location container may provide information regarding an occurrence location of the event. The application container may provide application-specific information of the application using the MCM. The multimedia content container may include or provide the multimedia content itself.

The management container may include at least one of time information for transmitting the MCM, a message ID, an ID of a linkable specific decentralized notification (DEN) message, and file format information of the multimedia content.

When the size of the MCM is too large, the ITS station may not be able to receive or process the message due to an insufficient storage space. In addition, when all the MCMs constituting one multimedia content are not received, the corresponding multimedia contents may not be rendered. In a current MCD protocol, the size of the content may not be known, so that the receiver may not receive all of the MCMs due to the insufficient storage space, or may unnecessarily perform the reception.

Further, the ITS station has a specific multimedia content and the same multimedia content may be transmitted by another ITS station. Even in this case, the ITS station may not confirm that the multimedia content being transmitted and the multimedia content that is currently being transmitted are the same content, so that the ITS station may receive the same multimedia content redundantly.

Further, the multimedia content may be more suitable for reception over a different path (e.g., broadband) than communication between the ITS stations.

In addition, the specific multimedia content is content optimized for a specific language, but it may be determined that only when the multimedia content is once received and rendered, the corresponding multimedia content is a content to which an inappropriate language is applied.

Therefore, hereinafter, the MCM structure and the MCD protocol that may solve the aforementioned problems will be described.

Figure 11:
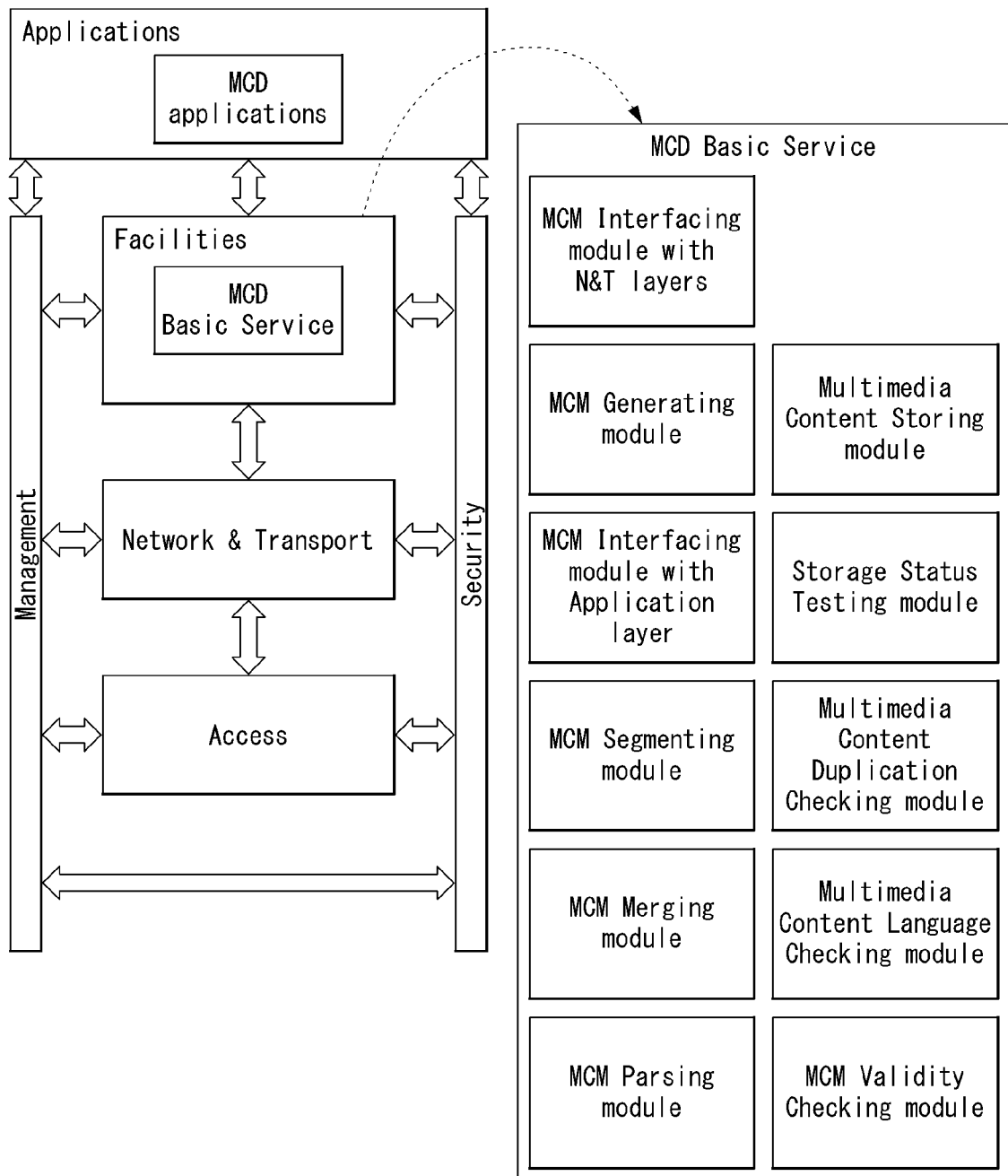
FIG. 11 illustrates an ITS station architecture, in particular, an architecture for message processing according to an embodiment of the present invention.

FIG. 11 illustrates an ITS station architecture, in particular, an architecture for message processing according to an embodiment of the present invention.

An MCD application is an application that describes events by using multimedia for various purposes. Various purposes include, for example, road safety, traffic management, driver assistance, travel information provision, commercial information provision, and personal/community information provision, and the like.

MCD basic service: In a sender ITS-S, the facility layer receives the multimedia content and other event descriptions/descriptions from the application layer and delivers the received content and description to the network/transport layer so as to transmit the received multimedia content and other event descriptions/descriptions to a receiver ITS-S. The facility layer may deliver the received multimedia content and description in a form of the MCM. The facility layer may split the multimedia content into multiple segments and deliver multiple MCMs to the network/transport layer. An entity that operates according to the MCD protocol may also be referred to as an MCD basic service entity.

In the receiver ITS-S, the facility layer may receive and parse the MCM from the network/transport layer and deliver the multimedia content and other event descriptions of the MCM to the application layer. When the multiple MCMs include the segments of the multimedia content, the facility layer may merge the segments into the multimedia content and deliver the merged multimedia content to the application layer. Alternatively, the facility layer may deliver the respective parsed segments to the application layer as it is. In such a process, the multimedia content or segments may be stored in a local storage. After parsing the MCM, the facility layer may perform a storage status test and decide a status type and the operation of the corresponding receiver. Further, the facility layer may perform operations such as duplicate verifying/checking, language checking, and validity checking. When a URL is discovered from the MCM, the facility layer may deliver the URL to an appropriate lower layer and the lower layer may retrieve/retrieve the multimedia content or segment by accessing the received URL.

Each of the modules illustrated in FIG. 11 may be provided as a separate module or may be a logical object implemented and operated by software. Modules provided to provide the MCM basic service of FIG. 11 will be described below.

MCM Interfacing module with N&T layers: In the MCD basic service of the sender ITS-S, an MCM interfacing module may deliver the multimedia contents received from the application layer and other event descriptions to the network/transport layer in the form of MCM. In the receiver ITS-S, the MCM interfacing module may receive and parse the MCM from the network/transport layer and deliver the multimedia content and other event descriptions of the MCM to the application layer.

MCM generating module: The MCM generating module of the sender ITS-S generates the MCM from at least one of multimedia content, the segment, and other event descriptions.

MCM interfacing module with application layer: In the sender ITS-S, the MCM interfacing module may receive the multimedia content and other even descriptions from the application layer and deliver the received multimedia content and other event descriptions to the network/transport layer in the form of MCM. In the receiver ITS-S, the MCM interfacing module may deliver the multimedia content and other event descriptions of the MCM, which are received from the network/transport layer to the application layer.

MCM segment module: The MCM segment module may split the multimedia content into the multiple segments.

MCM merging module: The MCM merging module of the receiver ITS-S may merge the multiple segments into the multimedia content.

MCM parsing module: The MCM parsing module of the receiver ITS-S may extract at least one of the multimedia content, the segment, and other event descriptions.

Multimedia content storing module: The multimedia content storing module may store the multimedia content or segments in a storage space such as a local storage.

Storage status testing module: The storage status testing module may perform status testing of the local storage. Testing by the storage status testing module may be used for deciding the status type and the corresponding operation of the storage.

Multimedia content duplication checking module: The multimedia content duplication checking module may perform duplication checking of the multimedia content.

Multimedia content language checking module: The multimedia content language checking module may perform language checking of the content.

MCM validity checking module: The MCM validity checking module may perform MCM validity (in time-wise) checking.

Figure 12:
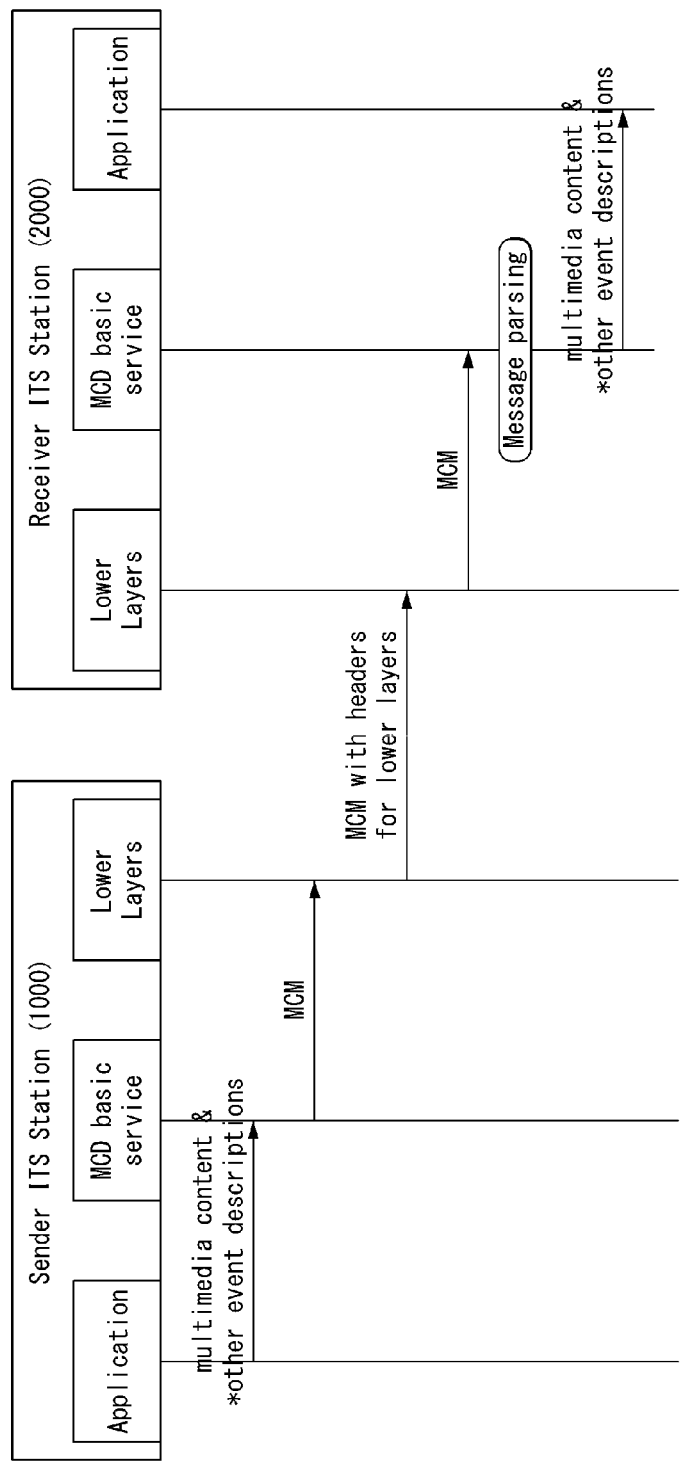
FIG. 12 illustrates an MCM transmitting/receiving method according to an embodiment of the present invention.

FIG. 12 illustrates an MCM transmitting/receiving method according to an embodiment of the present invention.

The information transmitted between a sender ITS station (ITS-S) 1000 and a receiver ITS station (ITS-S) 2000 may include an event description including a multimedia content and metadata related to the multimedia content. The multimedia content and the event description may be included in the MCM and delivered.

FIG. 12 illustrates an MCD operation when the multimedia content is included in one MCM and delivered.

The operation of the sender ITS station 1000 is as follows.

The application delivers the multimedia content and another event description to an MCD basic service entity of a facility layer. The MCD basic service entity formats the multimedia content and the event description and delivers the MCM to the lower layers. The lower layers transmit an MCM having a header for communication in the lower layers.

In this specification, the lower layers may include at least one of the network/transport layer or the access layer.

The operation of the receiver ITS station 2000 is as follows.

The lower layers receive the MCM having the header for communication in the lower layers and perform processing of the lower layers. The lower layers deliver the MCM to the MCD basic service entity. The MCD basic service entity parses the message with respect to the MCM. The MCD basic service entity delivers the parsed multimedia content and event description to the application.

Figure 13:
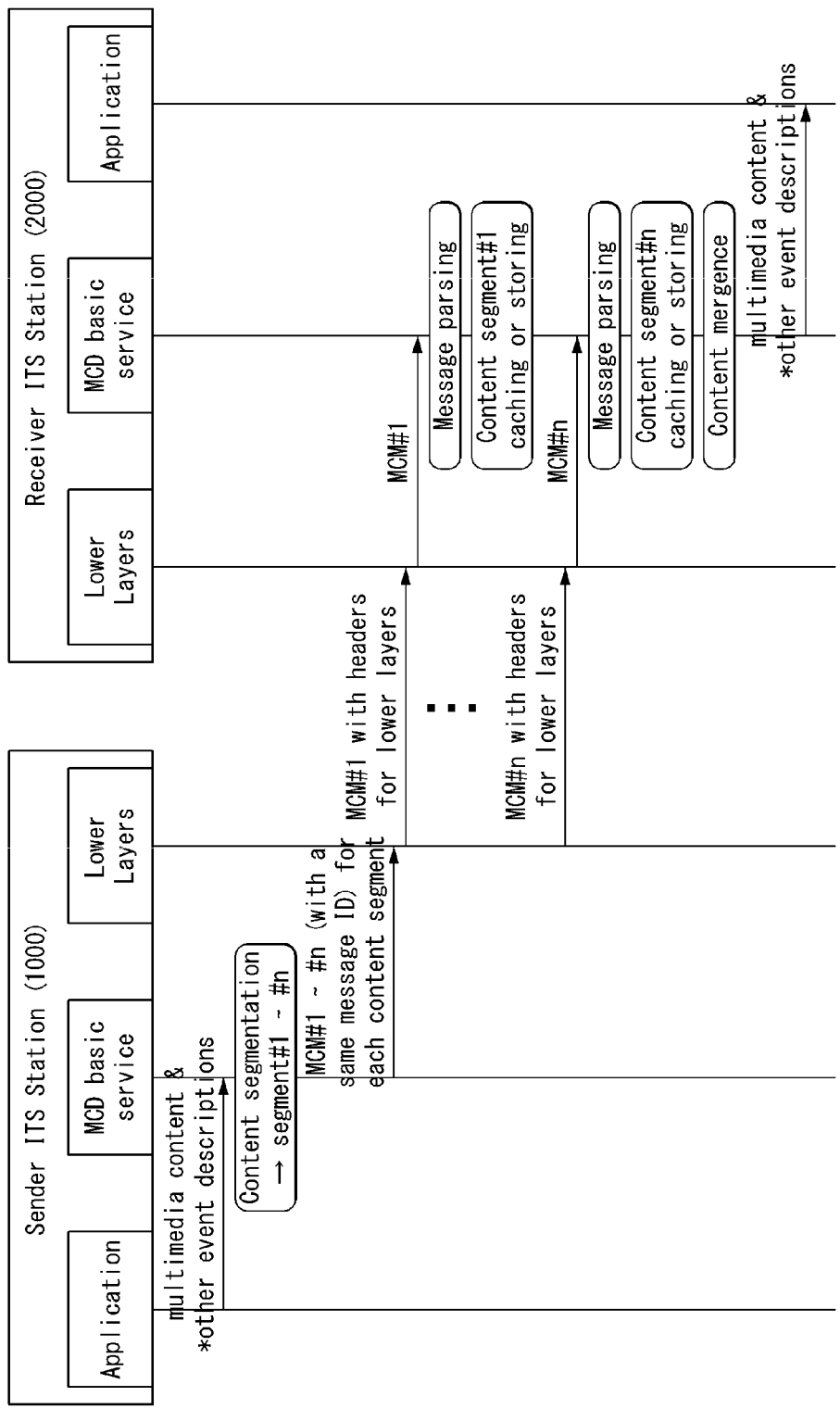
FIG. 13 illustrates an MCM transmitting/receiving method according to an embodiment of the present invention.

FIG. 13 illustrates an MCM transmitting/receiving method according to an embodiment of the present invention.

The information transmitted between the sender ITS station (ITS-S) 1000 and the receiver ITS station (ITS-S) 2000 may include an event description including a multimedia content and metadata related to the multimedia content. The multimedia content and the event description may be included in the MCM and delivered.

FIG. 13 illustrates an MCD operation when the multimedia content is divided into the multiple MCMs and delivered.

The operation of the sender ITS station 1000 is as follows.

The application delivers the multimedia content and another event description to the MCD basic service entity of the facility layer. The MCD basic service entity may split the multimedia content into multiple segments #1 to #n. The MCD basic service entity formats the multiple content segments and delivers multiple MCMs (MCMs #1 to #n) for each content segment to the lower layers. The lower layers transmit the multiple MCMs (MCMs #1 to #n) having the header for communication in the lower layers.

The operation of the receiver ITS station 2000 is as follows.

The lower layers receive a plurality of MCMs (MCM #1 to #n) having a header for communication in the lower layers, and perform processing of the lower layers. The lower layers transmit the multiple MCMs (MCMs #1 to #n) to the MCD basic service entity. The MCD basic service entity parses the message with respect to the multiple MCMs to acquire the content segments. The MCD basic service entity may cache or store the generated content segments. When the parsing of the multiple MCMs for one multimedia content is completed, the MCD basic service entity performs content mergence on the multiple parsed contents. The MCD basic service entity delivers the parsed multimedia content and event description to the application.

Figure 14:
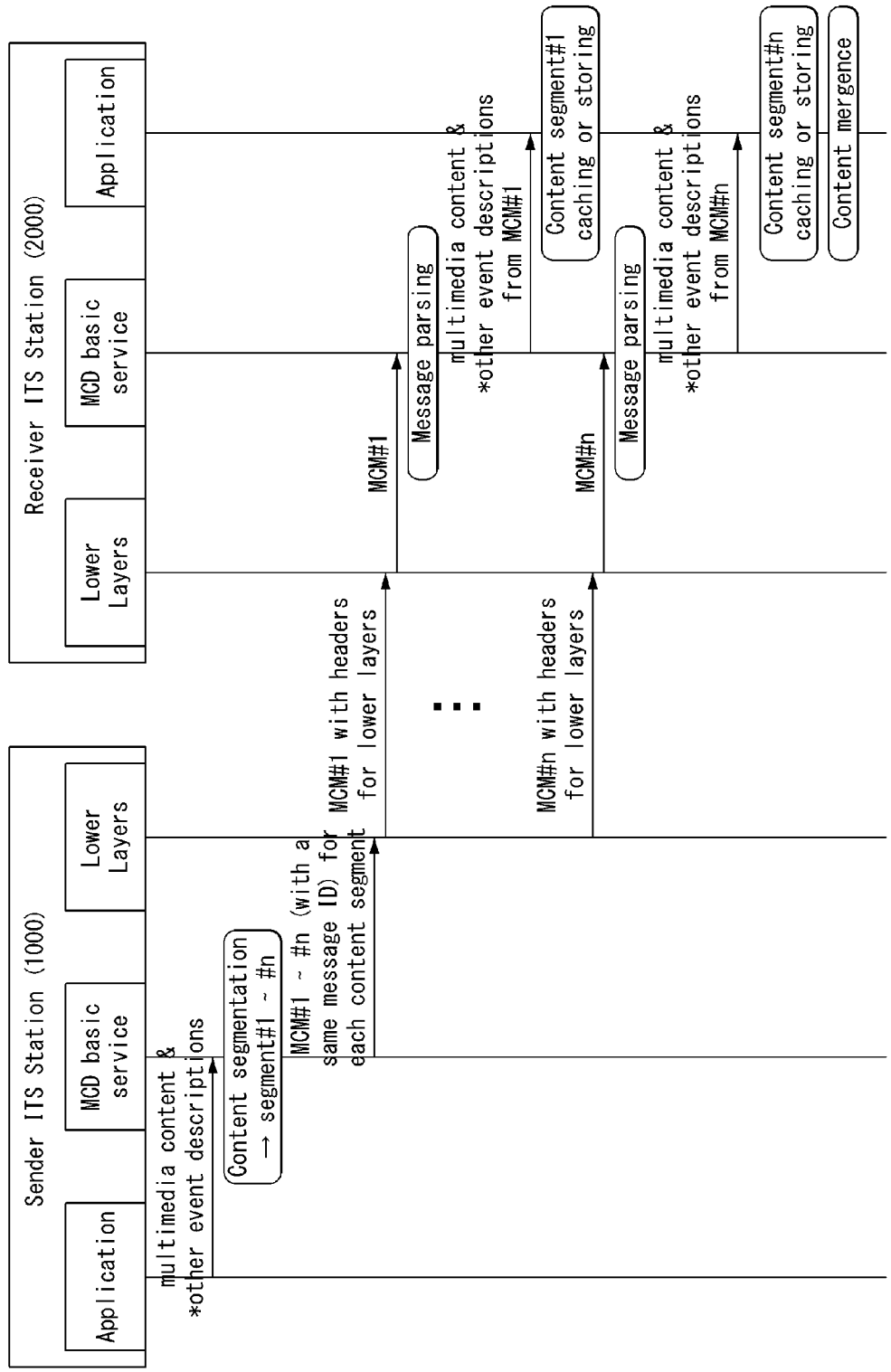
FIG. 14 illustrates an MCM transmitting/receiving method according to an embodiment of the present invention.

FIG. 14 illustrates an MCM transmitting/receiving method according to an embodiment of the present invention.

The information transmitted between a sender ITS station (ITS-S) 1000 and a receiver ITS station (ITS-S) 2000 may include an event description including a multimedia content and metadata related to the multimedia content. The multimedia content and the event description may be included in the MCM and delivered.

FIG. 14 illustrates an embodiment in which an application performs content mergence on the side of the receiver ITS station 2000 when the multimedia content is divided and delivered into plural MCMs. The same description as FIG. 13 is not duplicated.

The operation of the receiver ITS station 2000 is as follows.

Lower layers receive plural MCMs MCM #1 to MCM #n having a header for communication in the lower layers, and perform processing of the lower layers. The lower layers deliver the plural MCMs MCM #1 to MCM #n to an MCD basic service entity. The MCD basic service entity may acquire a plurality of content segments or a plurality of multimedia contents by performing message parsing for plural MCMs. In this case, the plurality of multimedia contents may include a segment for one multimedia content. The MCD basic service entity may deliver the acquired plurality of content segments or the obtained plurality of multimedia contents to an application.

The application may cache or store the plurality of multimedia contents or the plurality of content segments. Then, the application may perform content merge.

Figure 15:
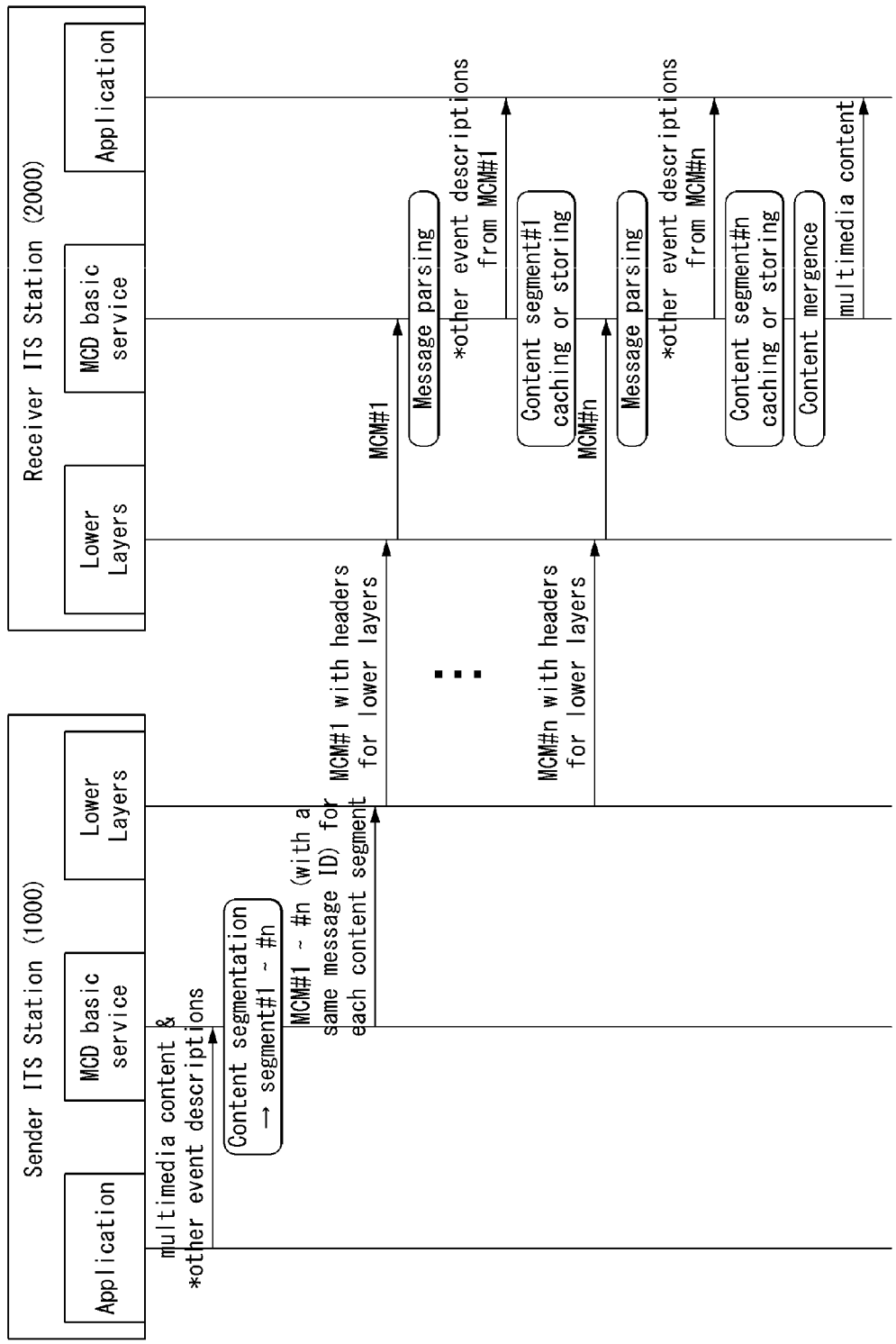
FIG. 15 illustrates an MCM transmitting/receiving method according to an embodiment of the present invention.

FIG. 15 illustrates an MCM transmitting/receiving method according to an embodiment of the present invention.

The information transmitted between a sender ITS station (ITS-S) 1000 and a receiver ITS station (ITS-S) 2000 may include an event description including a multimedia content and metadata related to the multimedia content. The multimedia content and the event description may be included in the MCM and delivered.

FIG. 15 illustrates an embodiment in which the multimedia content is divided and delivered into plural MCMs, and the content mergence at the receiver ITS station 2000 side is performed at a facility layer, but other event descriptions are directly delivered to an application layer. The same description as FIG. 13 is not duplicated.

The operation of the receiver ITS station 2000 is as follows.

Lower layers receive plural MCMs MCM #1 to MCM #n having a header for communication in the lower layers, and perform processing of the lower layers. The lower layers transmit the plural MCMs MCM #1 to MCM #n to an MCD basic service entity. The MCD basic service entity may acquire a plurality of content segments or a plurality of multimedia contents by performing message parsing for plural MCMs.

The MCD basic service entity may deliver each of the event descriptions acquired from the plurality of parsed MSMs to the application. The MCD basic service entity may cache or store the generated content segments. When the parsing of the plural MCMs for one multimedia content is completed, the MCD basic service entity performs content mergence on the plurality of parsed contents. The MCD basic service entity delivers the merged multimedia content to the application.

Figure 16:
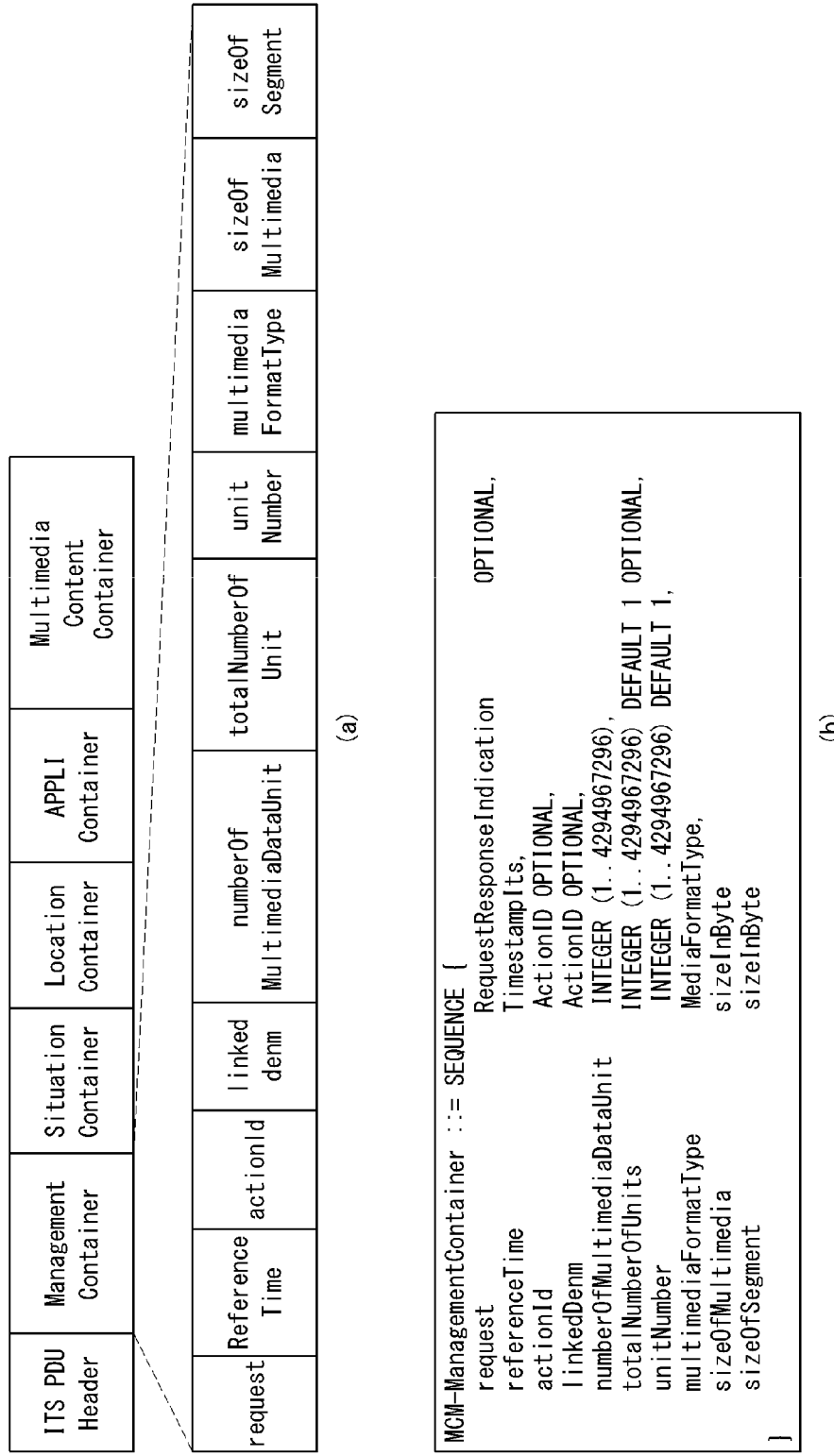
FIG. 16 illustrates a management container configuration of an MCM according to an embodiment of the present invention.

FIG. 16 illustrates a management container configuration of an MCM according to an embodiment of the present invention.

FIG. 16 illustrates the configuration of a management container included in the MCM illustrated in FIG. 10, and description of the field/data described in FIG. 10 is not duplicated.

FIG. 16A illustrates an MCM format including size information, and FIG. 16B illustrates a management container format having size information. The description of the information/field included in the management container is as follows.

request field: The request field indicates whether the MCM message is a request message or a response message.

referenceTime field: The reference time field indicates a MCM generation time.

actID field: The action ID field identifies the message as a combination of orginatingStationID and sequenceNumber.

linkedDenm: The linked DENM field identifies a related DENM.

numberofMultimediaDataUnit: The number field of multimedia data units indicates the number of multimedia data units in the multimedia container.

totalNumberOfUnits: The total number field of data units indicates the number of segments in the multimedia content.

unitNumber: The unit number field indicates the sequence number of the segment of the multimedia content.

multimediaFormatType: The multimedia format type field indicates the format of the multimedia content.

sizeOfMultimedia: The size field of multimedia indicates the size of the multimedia content delivered by at least one MCM in bytes. At least one MCM may have the same action ID.

sizeOfSegment: The size field of segment indicates the size of the segment of multimedia content delivered to this MCM in bytes.

Table 1 shows the definition of a sizeInByte data element. The multimedia size information and the segment size information as the data elements of sizeInByte are included in the management container to define the data size. The sizeInByte data element may define the size of any content in a unit of byte.

TABLE 1

| Descriptive Name | sizeInByte |
|---|---|
| Identifier | DataType_xxx |
| ASN.1 representation | sizeInByte ::= INTEGER(0..15000) |
| Definition | This DE (Data Element) defines the size in byte of any content. |
| Unit | N/A |

The MCD basic service entity of the facility layer of the receiver ITS-S may perform a storage status test based on multimedia size information, segment size information, and local storage information. The receiver ITS-S may determine a status type based on the storage status test. Based on the determined status type, the MCD basic service entity may determine i) whether to deliver the received MCM to the application, ii) whether to deliver the MCM segment to be received later to the application layer, iii) whether to perform the storage status test with respect to the MCM segment to be received.

The ITS-S may determine a condition and a type to perform the storage status test, and perform a behavior according to the determined type. Table 2 illustrates a condition, a status type and a corresponding behavior for the storage status test of the ITS-S.

TABLE 2

| Condition | Status Type | Receiver ITS-S Behavior |
|---|---|---|
| available storage amount >= overall content size | Status #1 | receiving all content segments AND no further status test needed |
| available storage amount < overall content size AND partial content rendering available | Status #2 | |
| AND available storage amount >= content segment size | Status #2-a | receiving this content segment AND further status test needed |
| AND available storage amount >= content segment size | Status #2-b | not receiving any content segment AND no further status test needed |
| available storage amount < overall content size AND | Status #3 | not receiving any content segment AND no |

TABLE 2-continued

| Condition | Status Type | Receiver ITS-S Behavior |
|---|---|---|
| partial content rendering not available | | further status test needed |

Figure 17:
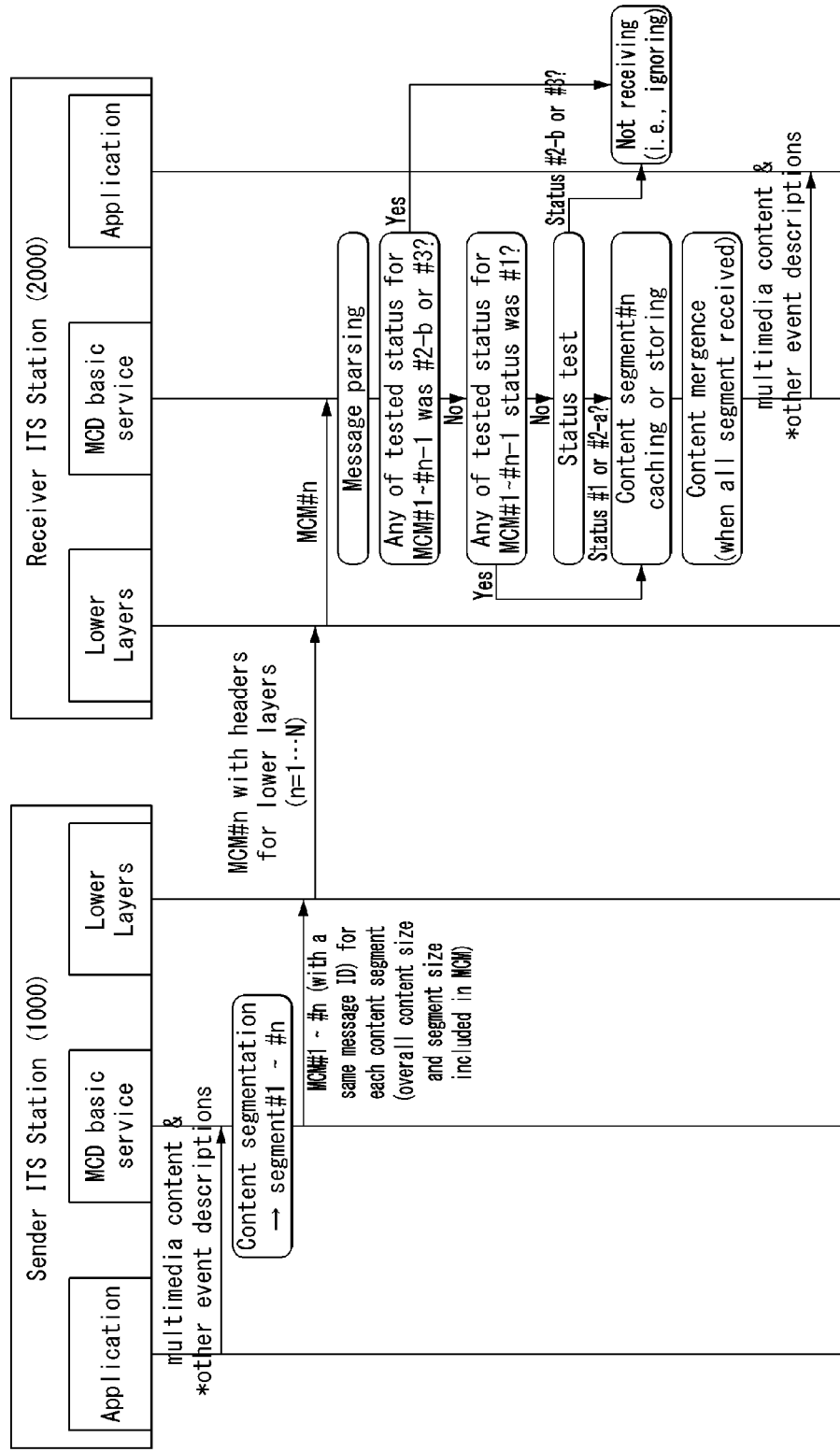
FIG. 17 illustrates an MCM transmitting/receiving method including size information according to an embodiment of the present invention.

FIG. 17 illustrates an MCM transmitting/receiving method including size information according to an embodiment of the present invention.

The information transmitted between a sender ITS station (ITS-S) 1000 and a receiver ITS station (ITS-S) 2000 may include an event description including multimedia contents and metadata related to the multimedia contents. The multimedia content and the event description may be included in the MCM and delivered.

FIG. 17 illustrates an MCD operation when the multimedia content is divided into the plural MCMs and delivered and particularly, an embodiment in which the size information is included in the MCM. The same description as FIGS. 13 to 15 is not duplicated.

The behavior of the receiver ITS station 2000 is as follows.

Lower layers receive plural MCMs MCM #1 to MCM #n having a header for communication in the lower layers, and perform processing of the lower layers. The lower layers deliver plural MCMs to a facility MCD basic service entity.

The MCD basic service entity parses the MCM and performs the status test. The status test may be performed as illustrated in Table 2 and the above description. That is, the MCD basic service entity acquires the multimedia size information and the segment size information from the MCM, and compares size information with an available size of the storage of the receiver ITS-S.

The MCD basic service entity may determine whether the tested status of the received and parsed MCMs MCM #1 to #n−1 before the parsed MCM #n corresponds to #2-b or #3. When the tested status of the preceding MCMs MCM #1 to #n−1 corresponds to #2-b or #3, the MCD basic service entity may not receive the MCM #n or be ignored. That is, the MCD basic service entity may discard the parsed segment #n.

The MCD basic service entity may further determine whether the tested status of the preceding MCMs MCM #1 to #n−1 corresponds to #1 when he tested status of the received and parsed MCMs MCM #1 to #n−1 before the parsed MCM #n does not correspond to #2-b or #3. When the tested status of the preceding MCMs does not also correspond to #1, the MCD basic service entity performs a status test on MCM #n. When the tested status of the preceding MCMs corresponds to #1, the MCD basic service entity may cache or store the content segment #n.

The MCD basic service entity may perform a status test on the MCM #n, i.e., the segment #n. When the tested status is #2-b or #3, the MCD basic service entity may not receive MCM #n or may be ignored. That is, the MCD basic service entity may discard the parsed segment #n. When the tested status is #1 or #2-a, the MCD basic service entity may cache or store the content segment #n.

In the embodiment of FIG. 17, the MCD basic service entity may merge the content. As an embodiment, the MCD basic service entity may perform content mergence when all segments corresponding to one multimedia content are received. The MCD basic service entity may deliver the merged content and other event descriptions to the application.

Figure 18:
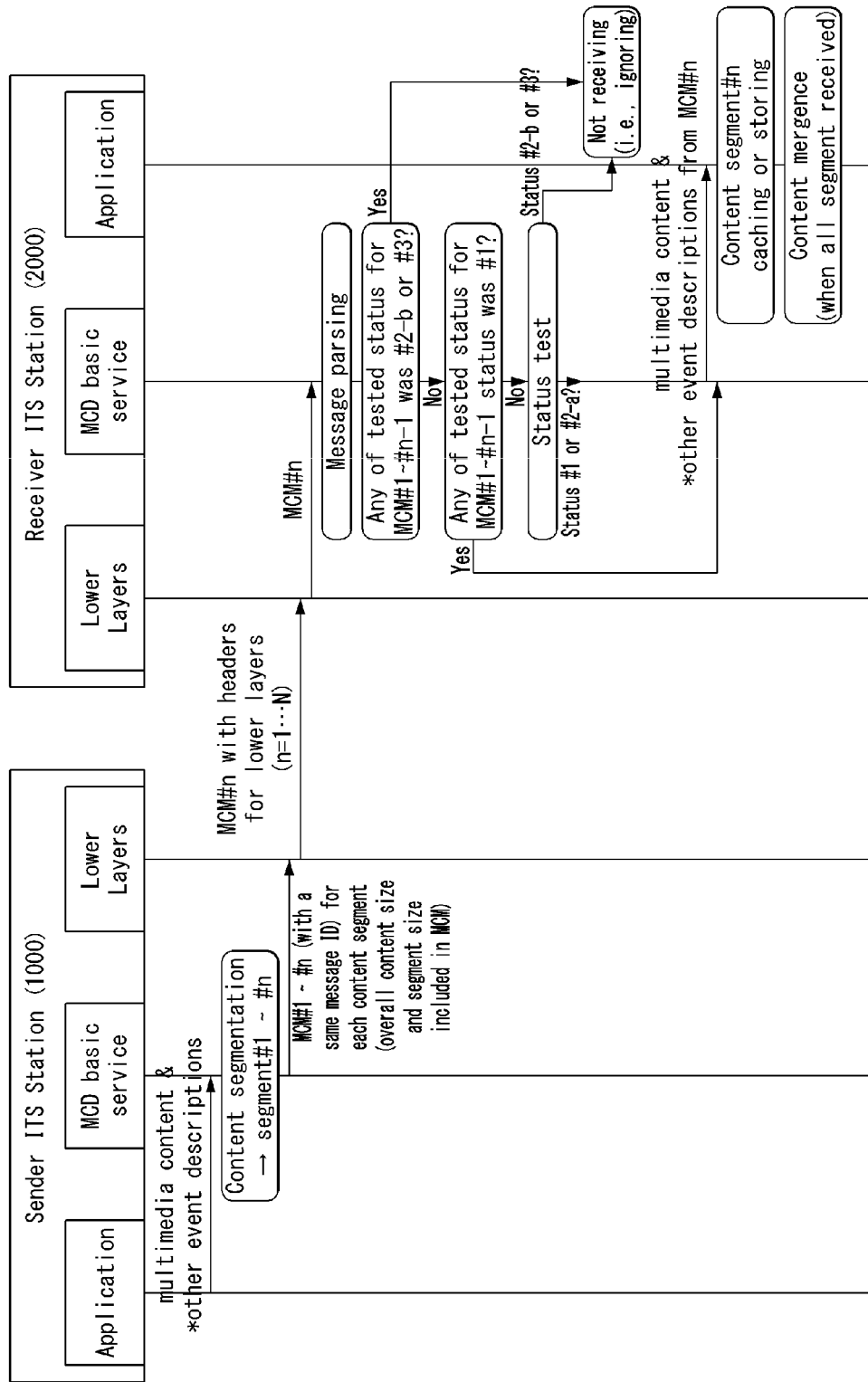
FIG. 18 illustrates an MCM transmitting/receiving method including size information according to an embodiment of the present invention.

FIG. 18 illustrates an MCM transmitting/receiving method including size information according to an embodiment of the present invention.

The information transmitted between a sender ITS station (ITS-S) 1000 and a receiver ITS station (ITS-S) 2000 may include an event description including a multimedia content and metadata related to the multimedia content. The multimedia content and the event description may be included in the MCM and delivered.

FIG. 18 illustrates an MCD operation when the multimedia content is divided into the plural MCMs and delivered and particularly, an embodiment in which the size information is included in the MCM. FIG. 18 illustrates an embodiment in which the application performs the content mergence at the receiver ITS station 2000 side. The same description as FIGS. 13 to 15 and 17 is not duplicated.

The behavior of the receiver ITS station 2000 is as follows.

In the embodiment of FIG. 18, the receiver ITS-S performs a status test on the MCMs in the same manner as in FIG. 17. However, in FIG. 18, the MCD basic service entity may deliver the acquired plurality of content segments or multimedia contents to an application.

The application may cache or store the plurality of multimedia contents or the plurality of content segments. Then, the application may perform content merge. As the embodiment, the application may perform content mergence when all segments corresponding to one multimedia content are received.

Figure 19:
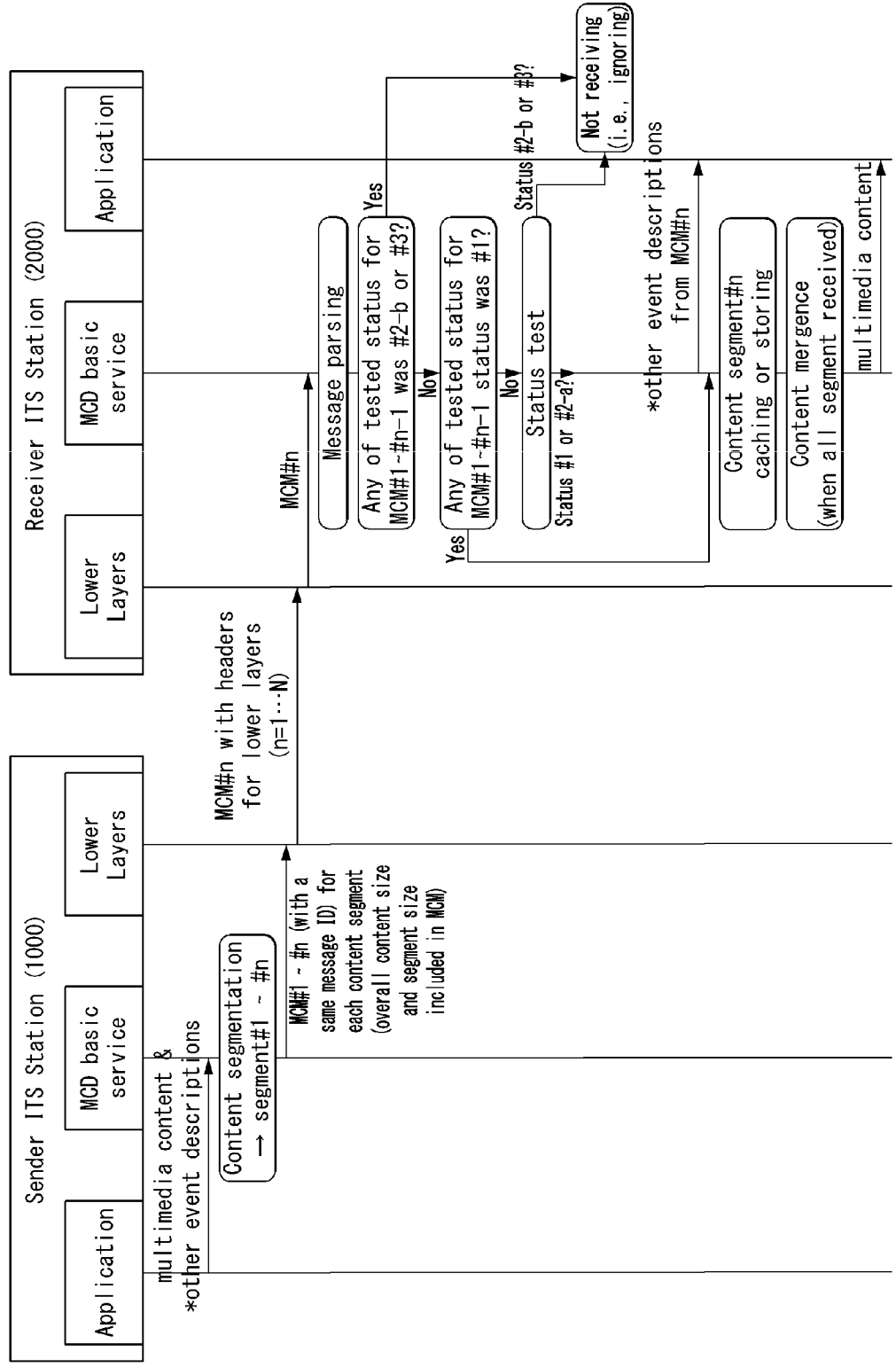
FIG. 19 illustrates an MCM transmitting/receiving method including size information according to an embodiment of the present invention.

FIG. 19 illustrates an MCM transmitting/receiving method including size information according to an embodiment of the present invention.

The information transmitted between a sender ITS station (ITS-S) 1000 and a receiver ITS station (ITS-S) 2000 may include an event description including a multimedia content and metadata related to the multimedia content. The multimedia content and the event description may be included in the MCM and delivered.

FIG. 19 illustrates an MCD operation when the multimedia content is divided into the plural MCMs and delivered and particularly, an embodiment in which the size information is included in the MCM. FIG. 19 illustrates an embodiment in which the content mergence at the receiver ITS station 2000 side is performed in the facility layer, but other event descriptions are directly delivered to the application layer. The same description as FIG. 13 is not duplicated. The same description as FIGS. 13 to 15, 17 and 18 is not duplicated.

In the embodiment of FIG. 19, the receiver ITS-S performs a status test on the MCMs in the same manner as in FIG. 17. However, in FIG. 19, the MCD basic service entity may deliver each of the event descriptions acquired from the parsed MSM to the application. The MCD basic service entity may cache or store the generated content segments. When the parsing of the plural MCMs for one multimedia content is completed, the MCD basic service entity performs content mergence on the plurality of parsed contents. As an embodiment, the MCD basic service entity may perform content mergence when all segments corresponding to one multimedia content are received. The MCD basic service entity delivers the merged multimedia content to the application.

Figure 20:
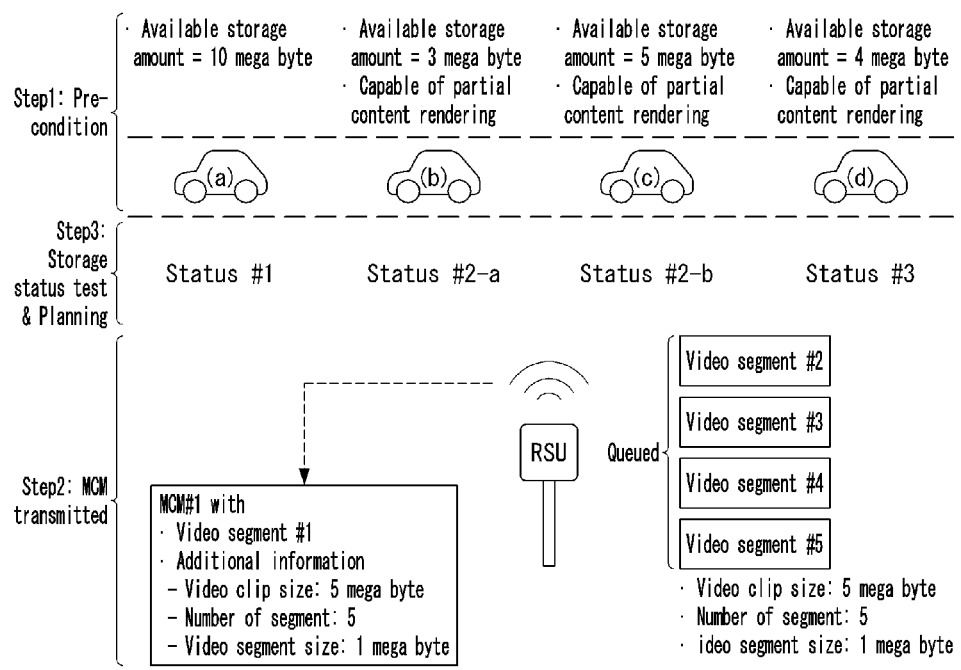
FIG. 20 illustrates an MCD operation using size information according to an embodiment of the present invention.

FIG. 20 illustrates an MCD operation using size information according to an embodiment of the present invention.

In FIG. 20, an RSU transmits a video file. The video file corresponds to a video clip of 5 megabytes. The video clip is divided into 5 segments of a size of 1 megabyte and transmitted. The currently transmitted MCM #1 includes video segment 1. The MCM may include multimedia content size information, segment number information, and segment size information. In the embodiment of FIG. 20, the content size information may indicate 5 megabytes, the segment number information may indicate 5, and the video segment size information may indicate 1 megabyte, respectively.

The size and decoding performance of an available storage space of a V2X device of each vehicle, that is, the ITS-S, are different from each other. In the case of vehicle (a), the available storage capacity is 10 megabytes. In the case of vehicle (b), the available storage capacity is 3 megabytes, and the ITS-S may perform partial content rendering. In the case of vehicle (c), the available storage capacity is 0.5 megabyte, and the ITS-S may perform partial content rendering. In the case of vehicle (d), the available storage capacity is 4 megabytes, and the ITS-S may not perform partial content rendering.

Each vehicle performs the status test as described above. In the case of vehicle (a), the tested status corresponds to status #1. Therefore, the vehicle (a) receives all the content segments, and no additional status test is required. In the case of vehicle (b), the tested status corresponds to status #2-a. Therefore, the vehicle (b) receives the corresponding content segment, and an additional status test is required. In the case of vehicle (c), the tested status corresponds to status #2-b. Therefore, the vehicle (c) does not receive the content segment and the additional status test is not required. In the case of vehicle (d), the tested status corresponds to status #3. Therefore, the vehicle (d) does not receive the content segment and the additional status test is not required.

Figure 21:
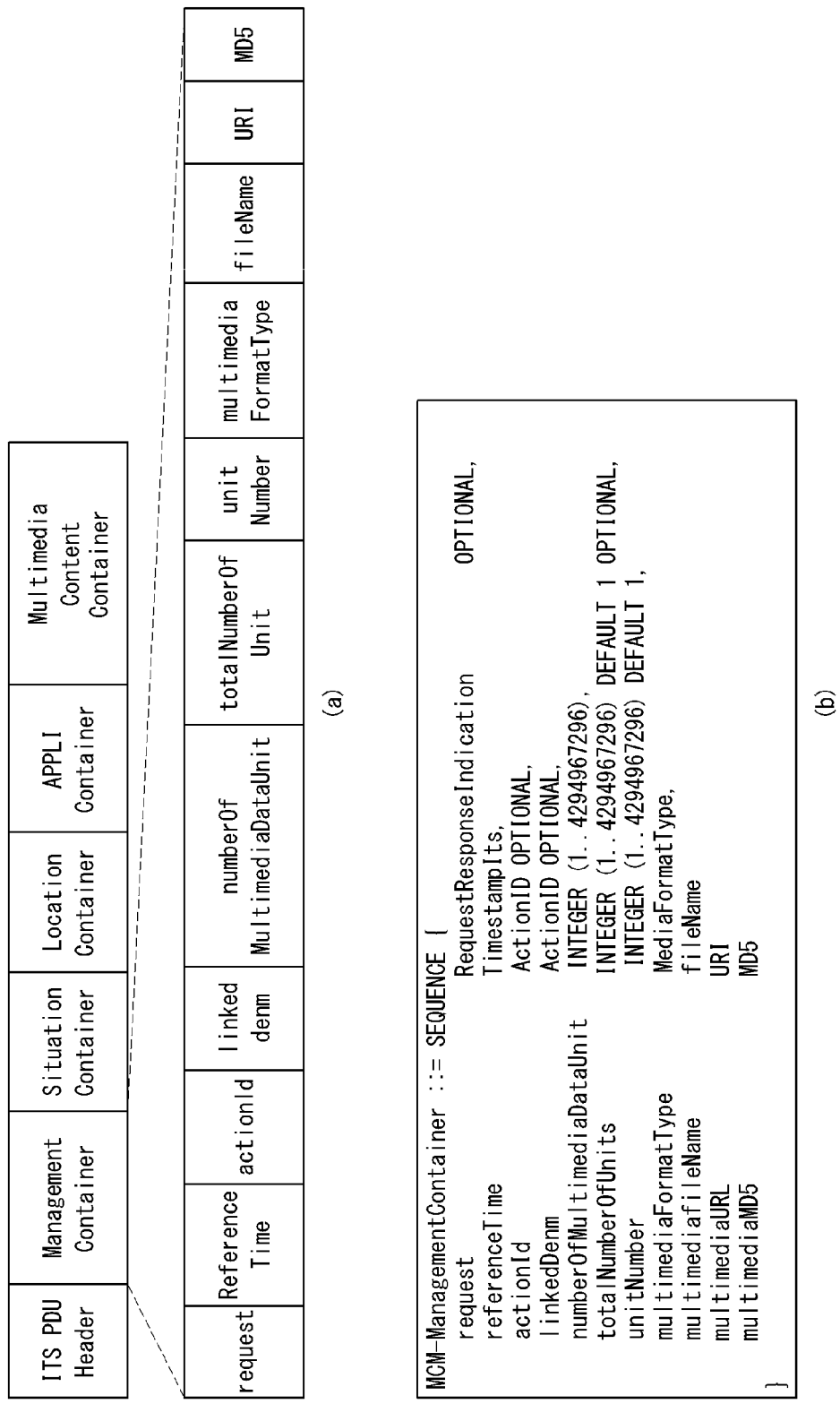
FIG. 21 illustrates a management container configuration of an MCM according to an embodiment of the present invention.

FIG. 21 illustrates a management container configuration of an MCM according to an embodiment of the present invention.

FIG. 21 illustrates the configuration of a management container included in the MCM illustrated in FIG. 10, and description of the field/data described above is not duplicated.

FIG. 21(a) illustrates an MCM format including file name information, URI information and MD5 information, FIG. 21(b) illustrates a container format including file name (fileName) information, uniform resource Identifier (URI) information, and MD5 information. Except for the file name information, the URI information, and the MD5 information, the description for the information/field included in the management container will be described with reference to the detailed description related with FIG. 16.

In the embodiment of FIG. 21 and Table 3 to 5, information identifying the multimedia content may be referred to as multimedia content identifier information or multimedia file identifier information. The MCM may include the multimedia identifier information. The multimedia identifier information may include at least one of file name information, URI information, or MD5 information.

Table 3 illustrates the definition of the file name data element. The file name information may define the file name of the multimedia content.

TABLE 3

| Descriptive Name | fileName |
|---|---|
| Identifier | DataType_xxx |
| ASN.1 representation | fileName ::= PrintableString (SIZE(N)) |

TABLE 3-continued

| Descriptive Name | fileName |
|---|---|
| Definition | This DE (Data Element) defines the file name of the multimedia content. |
| Unit | N/A |

Table 4 illustrates the definition of a URI data element. The URI information may define the URI of the multimedia content.

TABLE 4

| Descriptive Name | URI |
|---|---|
| Identifier | DataType_xxx |
| ASN.1 representation | URI ::= PrintableString (SIZE(N)) |
| Definition | This DE (Data Element) defines the URI of the multimedia content. |
| Unit | N/A |

Table 5 illustrates the definition of an MD5 data element. The MD5 information may define a MD5 value of the multimedia content.

TABLE 5

| Descriptive Name | MD5 |
|---|---|
| Identifier | DataType_xxx |
| ASN.1 representation | MD5 ::= PrintableString (SIZE(N)) |
| Definition | This DE (Data Element) defines the MD5 value of the multimedia content. |
| Unit | N/A |

Figure 22:
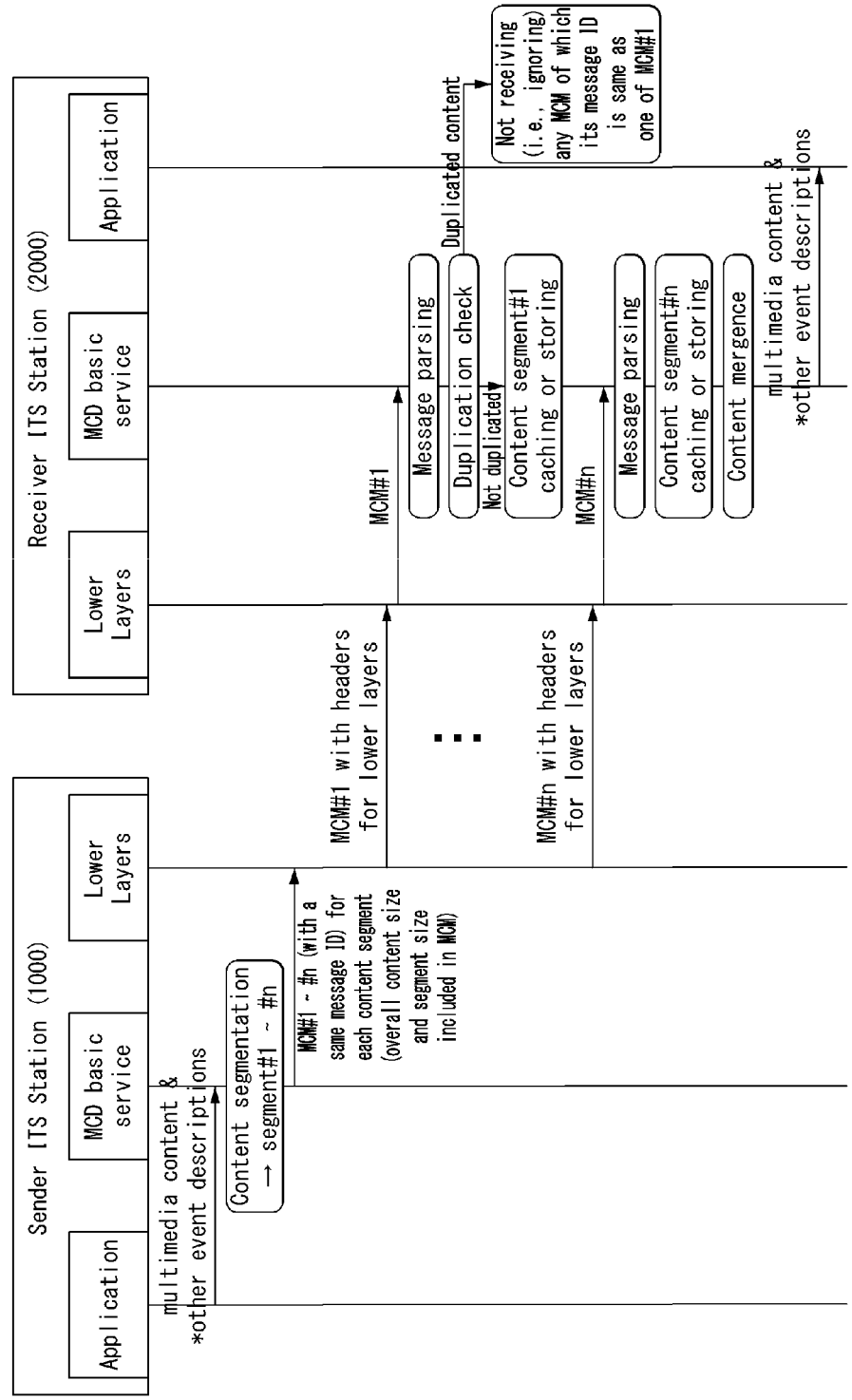
FIG. 22 illustrates an MCM transmitting/receiving method according to an embodiment of the present invention.

FIG. 22 illustrates an MCM transmitting/receiving method according to an embodiment of the present invention.

The information transmitted between a sender ITS station (ITS-S) 1000 and a receiver ITS station (ITS-S) 2000 may include an event description including a multimedia content and metadata related to the multimedia content. The multimedia content and the event description may be included in the MCM and delivered.

FIG. 22 illustrates an MCD operation when the multimedia content is divided into plural MCMs and delivered. In particular, FIG. 22 illustrates an embodiment in which the MCM includes multimedia content identifier information. The same description as FIGS. 13 to 15 is not duplicated.

The receiver ITS station 2000 parses the MCM and performs a duplicate check. The MCD basic service entity may check whether the content delivered by the received message is a content that has been received or processed based on the multimedia content identifier information acquired from the MCM. When the content of the receiving MCM is a content that overlaps with the preprocessed content, the receiver ITS station 2000 may not receive or ignore/discard MCMs having the same message ID as this MCM. When the content of the receiving MCM is not the content that overlaps with the preprocessed content, the receiver ITS station 2000 may process the MCM as described in FIG. 13.

Figure 23:
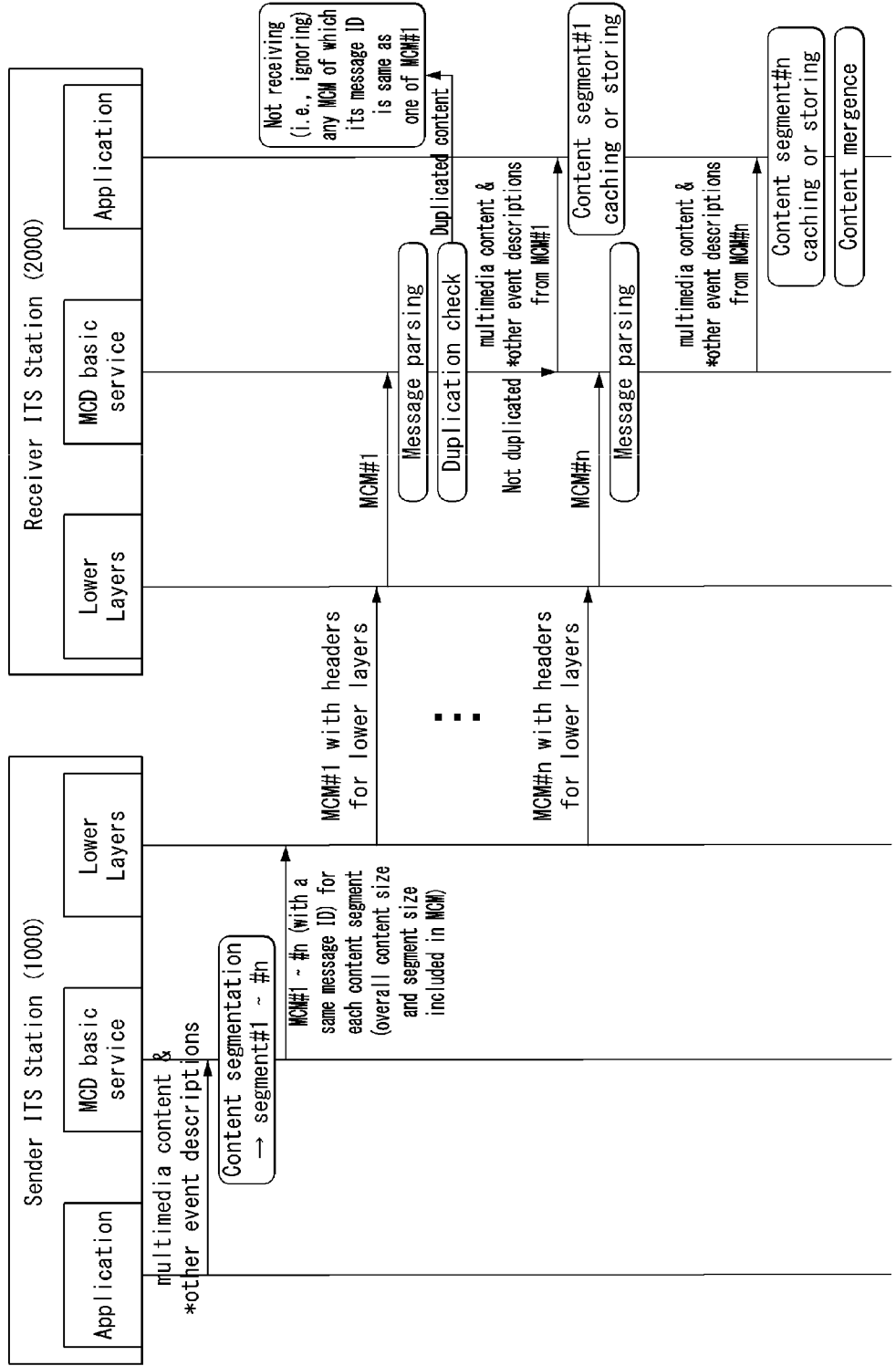
FIG. 23 illustrates an MCM transmitting/receiving method according to an embodiment of the present invention.

FIG. 23 illustrates an MCM transmitting/receiving method according to an embodiment of the present invention.

The information transmitted between a sender ITS station (ITS-S) 1000 and a receiver ITS station (ITS-S) 2000 may include an event description including a multimedia content and metadata related to the multimedia content. The multimedia content and the event description may be included in the MCM and delivered.

FIG. 23 illustrates an MCD operation when the multimedia content is divided into plural MCMs and delivered. In particular, FIG. 23 illustrates an embodiment in which the MCM includes multimedia content identifier information. The same description as FIGS. 13 to 15 is not duplicated.

The receiver ITS station 2000 parses the MCM and performs a duplicate check. The MCD basic service entity may check whether the content delivered by the received message is a content that has been received or processed based on the multimedia content identifier information acquired from the MCM. When the content of the receiving MCM is a content that overlaps with the preprocessed content, the receiver ITS station 2000 may not receive or ignore/discard MCMs having the same message ID as this MCM. When the content of the receiving MCM is not the content that overlaps with the preprocessed content, the receiver ITS station 2000 may process the MCM as described in FIG. 14.

Figure 24:
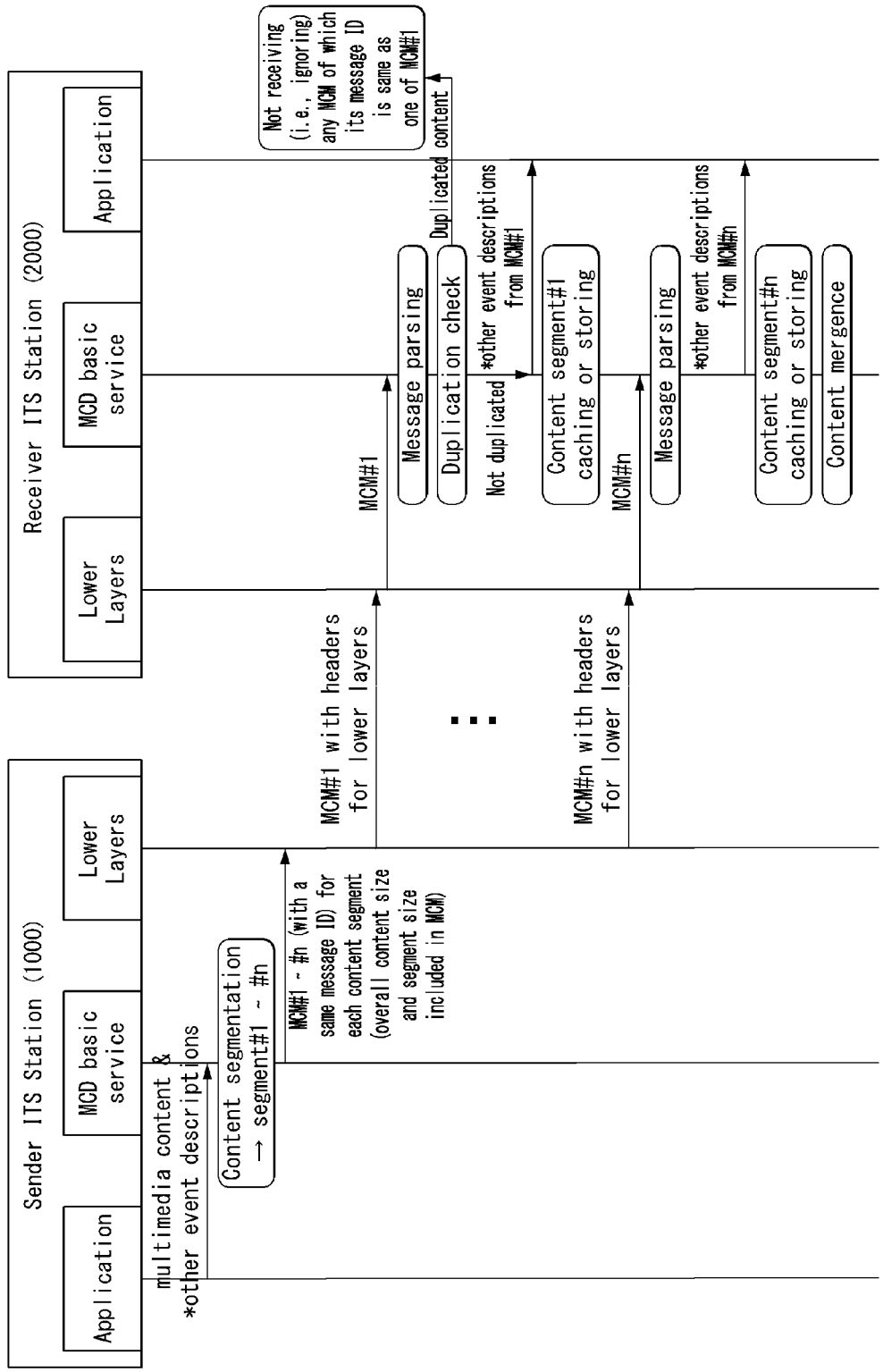
FIG. 24 illustrates an MCM transmitting/receiving method according to an embodiment of the present invention.

FIG. 24 illustrates an MCM transmitting/receiving method according to an embodiment of the present invention.

The information transmitted between a sender ITS station (ITS-S) 1000 and a receiver ITS station (ITS-S) 2000 may include an event description including a multimedia content and metadata related to the multimedia content. The multimedia content and the event description may be included in the MCM and delivered.

FIG. 24 illustrates an embodiment in which the multimedia content is divided into plural MCMs and delivered, and the content mergence at the receiver ITS station 2000 side is performed at a facility layer, but other event descriptions are directly delivered to an application layer. In particular, FIG. 24 illustrates an embodiment in which the MCM includes multimedia content identifier information. The same description as FIGS. 13 to 15 is not duplicated.

The receiver ITS station 2000 parses the MCM and performs a duplicate check. The MCD basic service entity may check whether the content delivered by the received message is a content that has been received or processed based on the multimedia content identifier information acquired from the MCM. When the content of the receiving MCM is a content that overlaps with the preprocessed content, the receiver ITS station 2000 may not receive or ignore/discard MCMs having the same message ID as this MCM. When the content of the receiving MCM is not the content that overlaps with the preprocessed content, the receiver ITS station 2000 may process the MCM as described in FIG. 15.

Figure 25:
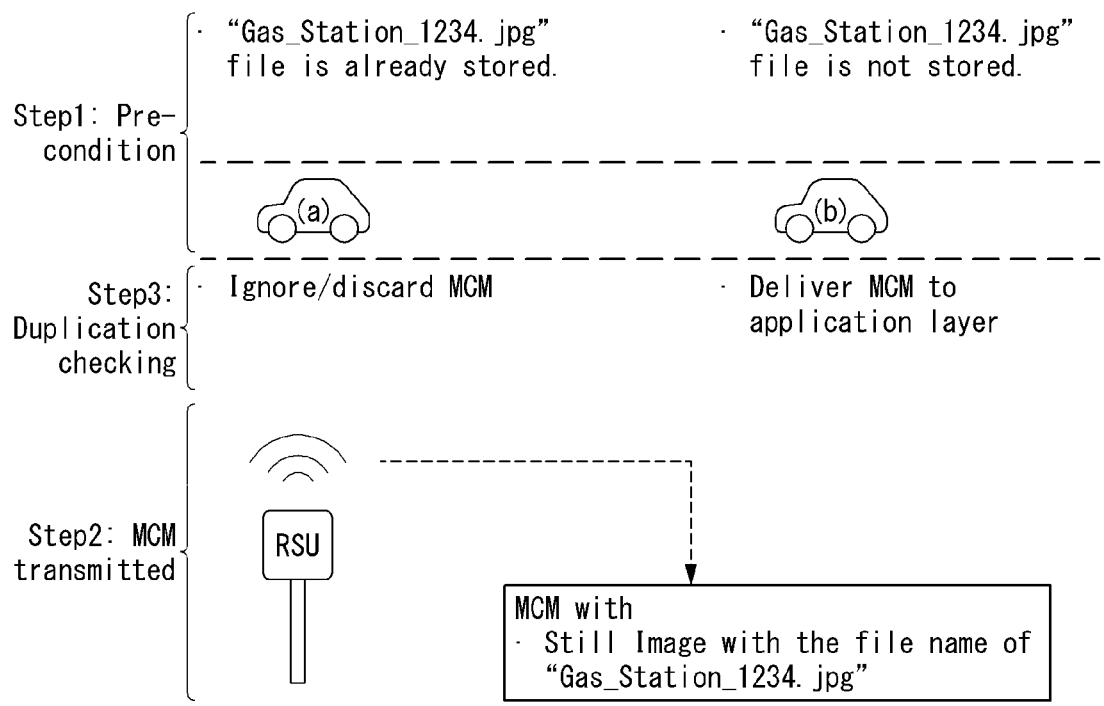
FIG. 25 illustrates an MCD operation using multimedia content identifier information according to an embodiment of the present invention.

FIG. 25 illustrates an MCD operation using multimedia content identifier information according to an embodiment of the present invention.

In FIG. 25, an RSU transmits a still image file. A file name of the image file is "Gas_Station_1234.jpg". When the RSU transmits an image file, an MCM header including the image file includes the aforementioned multimedia content identifier information. In the embodiment of FIG. 25, the MCM header includes file name information, and the file name information may indicate "Gas_Station_1234.jpg".

The video file corresponds to a video clip of 5 megabytes. The video clip is divided into 5 segments of a size of 1 megabyte and transmitted. The currently transmitted MCM #1 includes video segment 1. The MCM may include multimedia content size information, segment number information, and segment size information. In the embodiment of FIG. 20, the content size information may indicate 5 megabytes, the segment number information may indicate 5, and the video segment size information may indicate 1 megabyte, respectively.

The status of the V2X device of each vehicle, that is, the ITS-S, is different from each other. In the case of vehicle (a), a file "Gas_Station_1234.jpg" is already stored. In the case of vehicle (b), a file "Gas_Station_1234.jpg" is not stored.

Each vehicle performs the duplicating check as described above. In the case of vehicle (a), a duplication file is already stored. Accordingly, the vehicle (a) may ignore the MCM and may not deliver the MCM to the application layer. That is, the vehicle (a) may discard the MCM corresponding to the duplication file. In the case of the vehicle (b), the received MCM transmits a new file. Accordingly, the vehicle (b) may receive and process the MCM and deliver the processed file/segment to the application layer.

Figure 26:
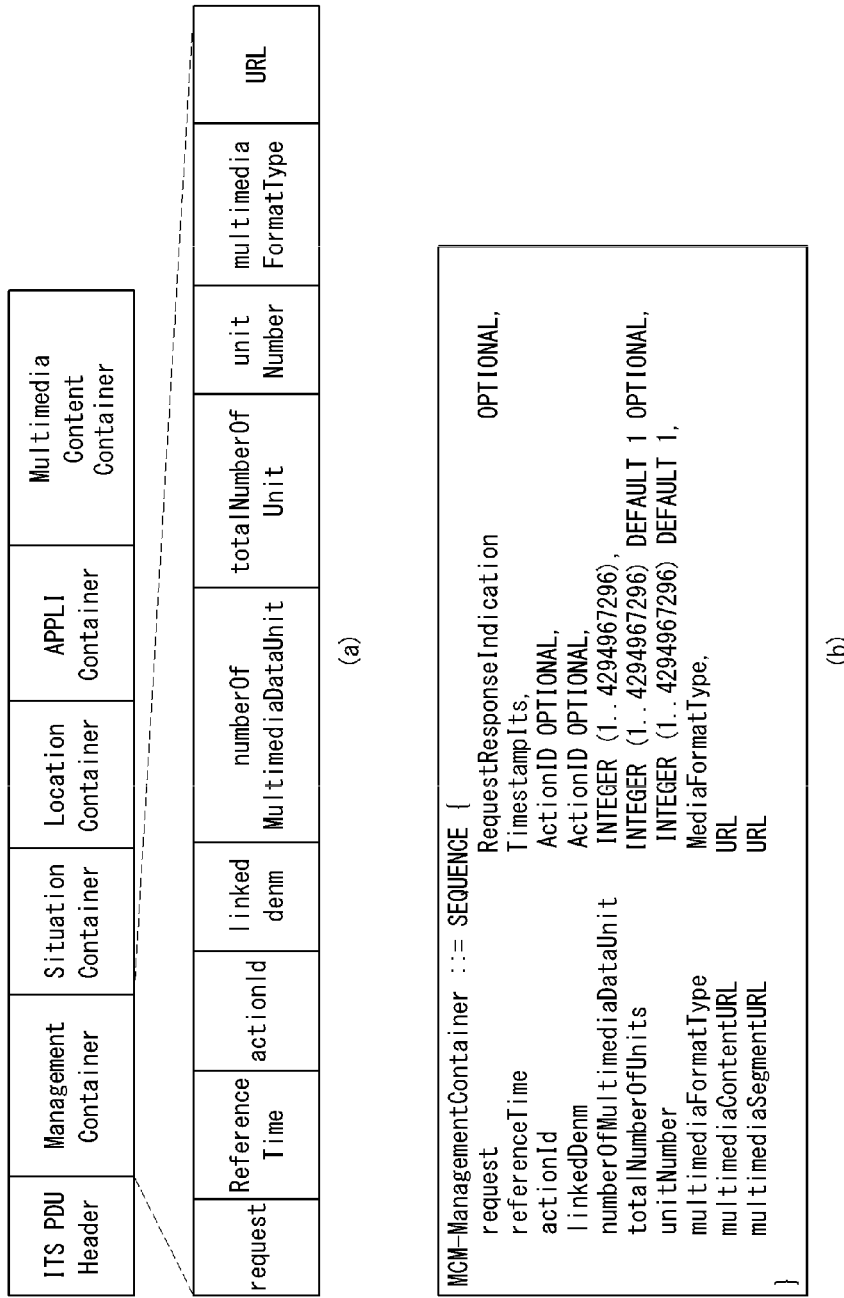
FIG. 26 illustrates a management container configuration of an MCM according to an embodiment of the present invention.

FIG. 26 illustrates a management container configuration of an MCM according to an embodiment of the present invention.

FIG. 26 illustrates the configuration of a management container included in the MCM illustrated in FIG. 10, and description of the field/data described above is not duplicated.

FIG. 26(a) illustrates an MCM format including a uniform resource locator (URL) information, and FIG. 26(b) illustrates a management container format having the URL information. Except for the URL field/information, the description for the information/field included in the management container will be described with reference to the above description related with FIG. 16.

Table 6 illustrates the definition of a URL data element. The URL information may define a URL of a resource. That is, the URL information may indicate a URL capable of downloading the multimedia content.

TABLE 6

| Descriptive Name | URL |
| --- | --- |
| Identifier | DataType_xxx |
| ASN.1 representation | URL ::= PrintableString (SIZE(N)) |
| Definition | This DE (Data Element) defines the URL of resource. |
| Unit | N/A |

Figure 27:
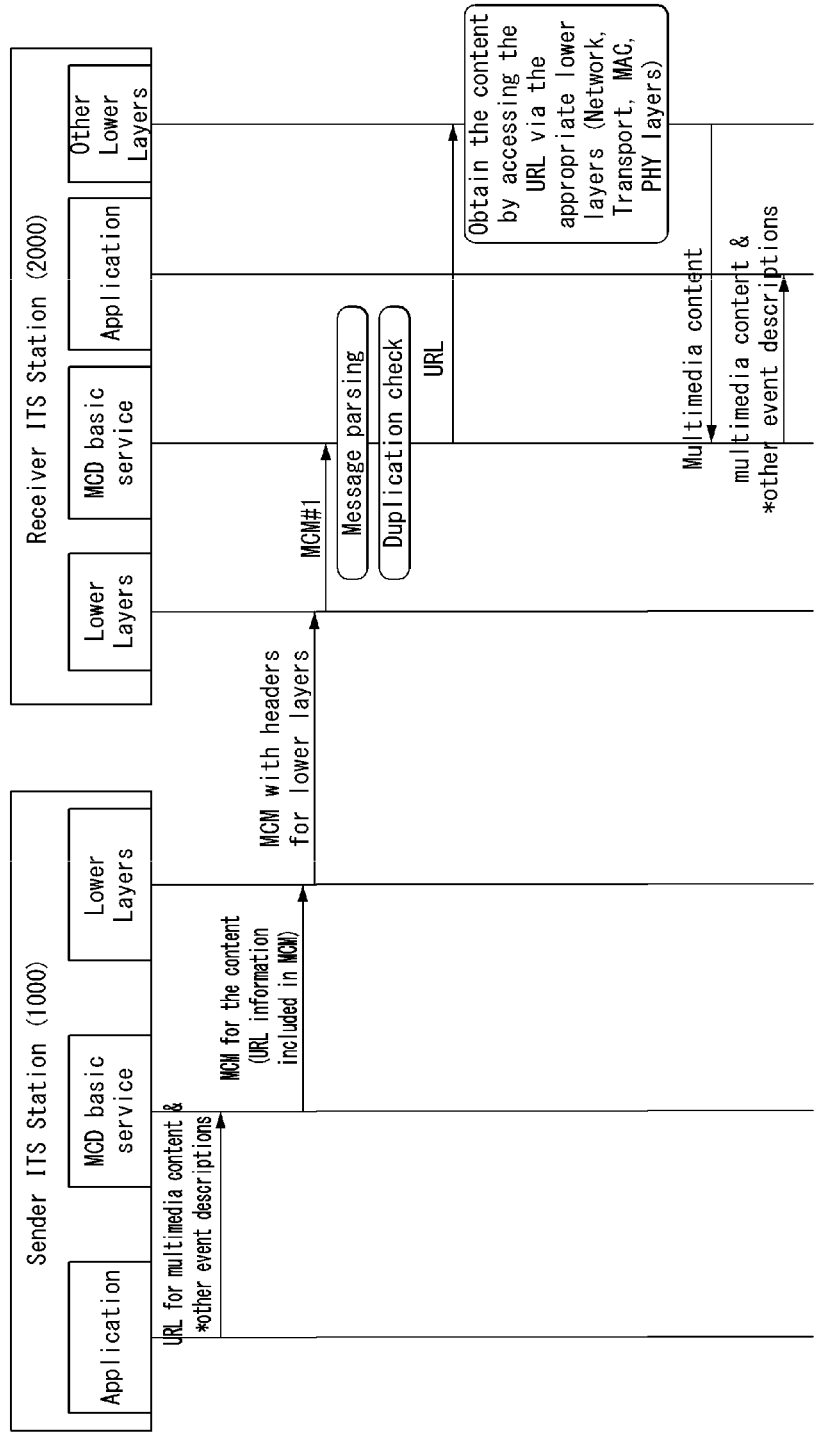
FIG. 27 illustrates an MCM transmitting/receiving method according to an embodiment of the present invention.

FIG. 27 illustrates an MCM transmitting/receiving method according to an embodiment of the present invention.

The information transmitted between a sender ITS station (ITS-S) 1000 and a receiver ITS station (ITS-S) 2000 may include an event description including a multimedia content and metadata related to the multimedia content. The multimedia content and the event description may be included in the MCM and delivered.

FIG. 27 illustrates an embodiment in which the MCM includes the URL information.

The behavior of the sender ITS station 1000 is as follows.

The application delivers a URL for the multimedia content and another event description to an MCD basic service entity of a facility layer. The MCD basic service entity generates an MCM for the content and delivers the generated MCM to the lower layers. The generated MCM includes URL information. Lower layers transmit an MCM having a header for communication in the lower layers.

The behavior of the receiver ITS station 2000 is as follows.

The lower layers receive an MCM having a header for communication in the lower layers and perform processing of the lower layers. The lower layers deliver the MCM to the MCD basic service entity. The MCD basic service entity parses a message and checks URL information. The MCD basic service entity delivers the URL information to other lower layers.

Other lower layers of the receiver ITS station 2000 may acquire contents by accessing the URL. The receiving ITS station may use lower layers (at least one of a network layer, a transport layer, a MAC layer, and a physical layer) that operate based on a protocol capable of receiving the content based on the URL.

Other lower layers may access the URL and deliver the received multimedia content to the MCD basic service entity. The MCD basic service entity may provide the multimedia content and other event descriptions to the application.

Figure 28:
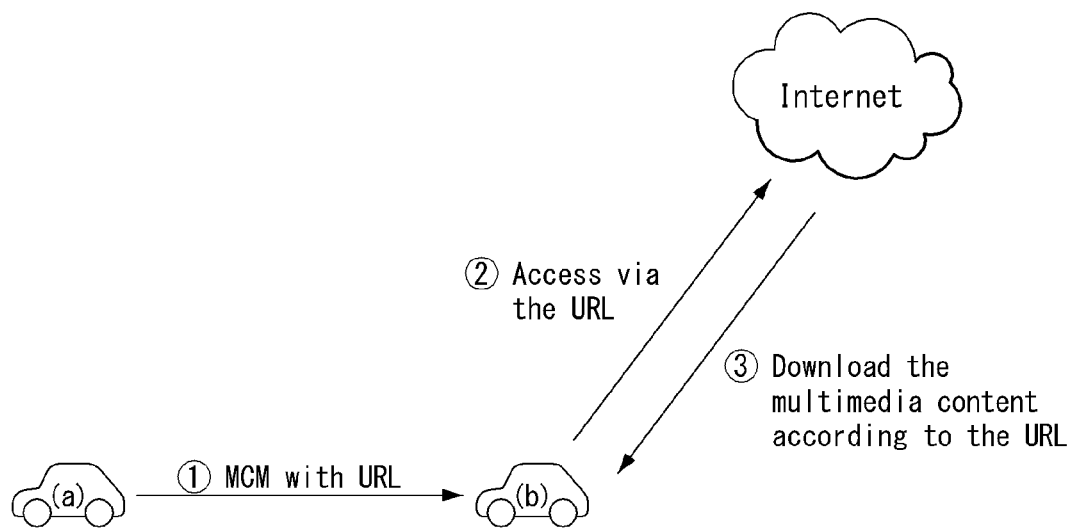
FIG. 28 illustrates an MCD operation using URL information according to an embodiment of the present invention.

FIG. 28 illustrates an MCD operation using URL information according to an embodiment of the present invention.

In FIG. 28, vehicle (a) may transmit an MCM including URL information to vehicle (b). Vehicle (b) receives and parses the MCM to acquire the URL information. Vehicle (b) may access the URL and download the multimedia content. The URL may be a predetermined Internet address in which the multimedia content may be downloaded through accessing.

Figure 29:
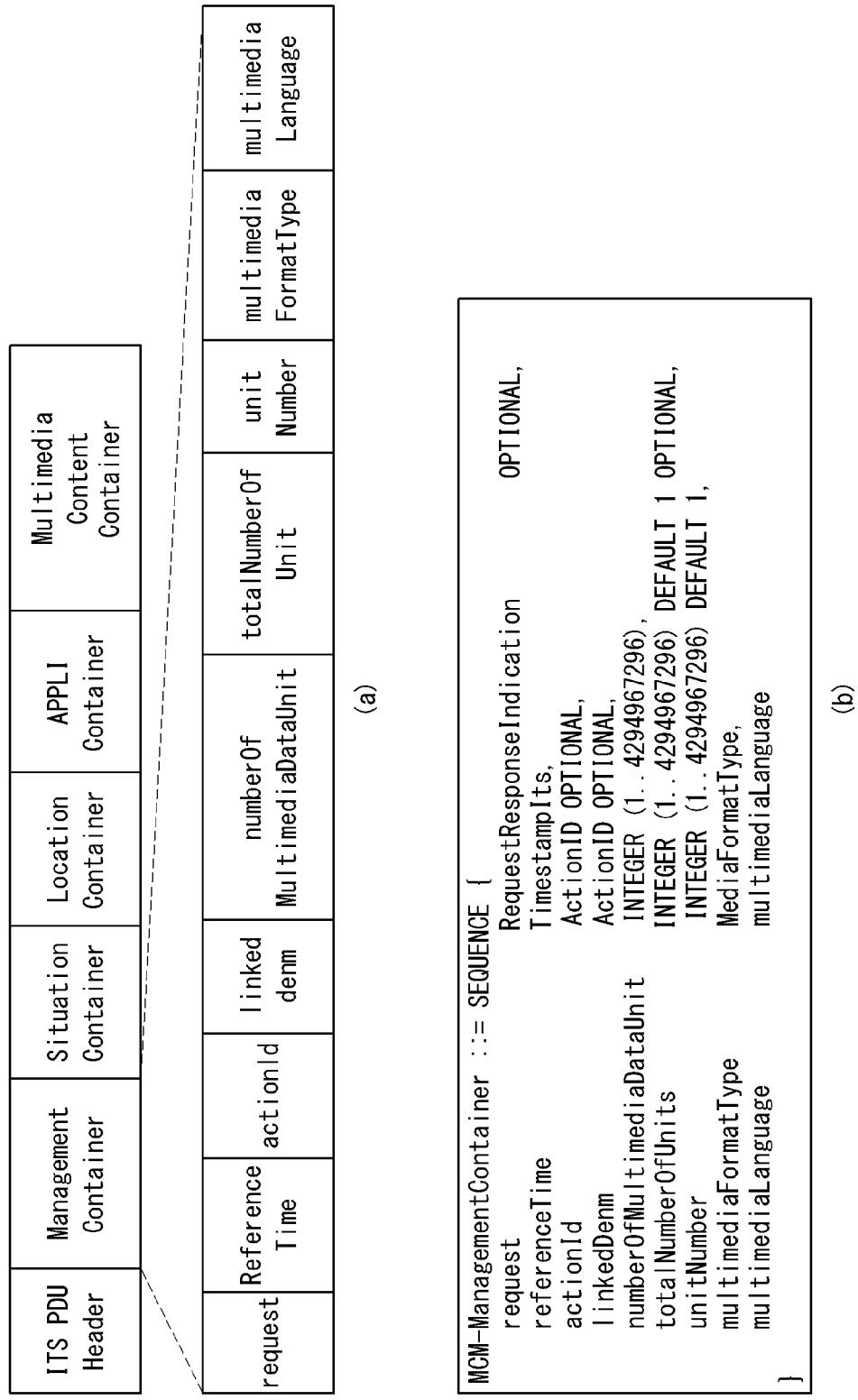
FIG. 29 illustrates a management container configuration of an MCM according to an embodiment of the present invention.

FIG. 29 illustrates a management container configuration of an MCM according to an embodiment of the present invention.

FIG. 29 illustrates the configuration of the management container included in the MCM illustrated in FIG. 10 and a description of the field/data is not duplicated.

FIG. 29(*a*) illustrates an MCM format including multimedia language information and FIG. 29(*b*) illustrates a management container format including multimedia language information. Except for the multimedia language information, the information/field included in the management container will be described with reference to FIG. 16 and the related description.

Table 7 shows a definition of a multimedia language data element. The multimedia language information may define a language used by the multimedia content. The multimedia language information may indicate a standardized language code such as ISO 639-1. Alternatively, the multimedia language information may indicate a numeric value to which a character-valued language code is mapped to reduce a format size.

TABLE 7

| Descriptive Name | fileName |
|---|---|
| Identifier | DataType_xxx |
| ASN.1 representation | MultimediaLanguage ::= INTEGER {English(1), Korean(2), ... } (1..1000) Or MultimediaLanguage ::= PrintableString (SIZE(2)) |
| Definition | This DE (Data Element) defines the language used by the multimedia content. |
| Unit | N/A |

The receiver ITS-S may perform a language check based on the multimedia language information included in the MCM. The language check may be performed in different modes according to a location of a language check entity.

1. Language Check Mode A: When the Language Check Entity is an MCD Basic Service Entity In mode A, a facility layer entity of the MCD basic service may maintain or access a set of acceptable languages. The MCD basic service may check whether the language information of the received MCM matches the set of acceptable languages.

2. Language Check Mode B: When the Language Check Entity is the Application

In mode B, the facility layer entity of the MCD basic service does not maintain or access the set of allowable languages. When the MCD basic service receives or acquires the language information, the MCD basic service delivers the language information to the application. The application may maintain or access the set of acceptable languages. The application may check whether the language information of the received MCM matches the set of acceptable languages.

3. Language Check Mode C: When a Human Machine Interface (HMI) of the Facility Layer In mode C, the facility layer entity of the MCD basic service does not maintain or access the set of allowable languages. When the MCD basic service receives or acquires the language information, the ITS-S may ask the user/driver via the HIM whether the language is acceptable.

4. Language Check Mode D: When the Application Asks the User/Driver

In mode D, the facility layer entity of the MCD basic service does not maintain or access the set of allowable languages. When the MCD basic service receives or acquires the language information, the MCD basic service delivers the language information to the application. The application may ask the user/driver whether the corresponding language is acceptable through the HIM and/or directly.

Figure 30:
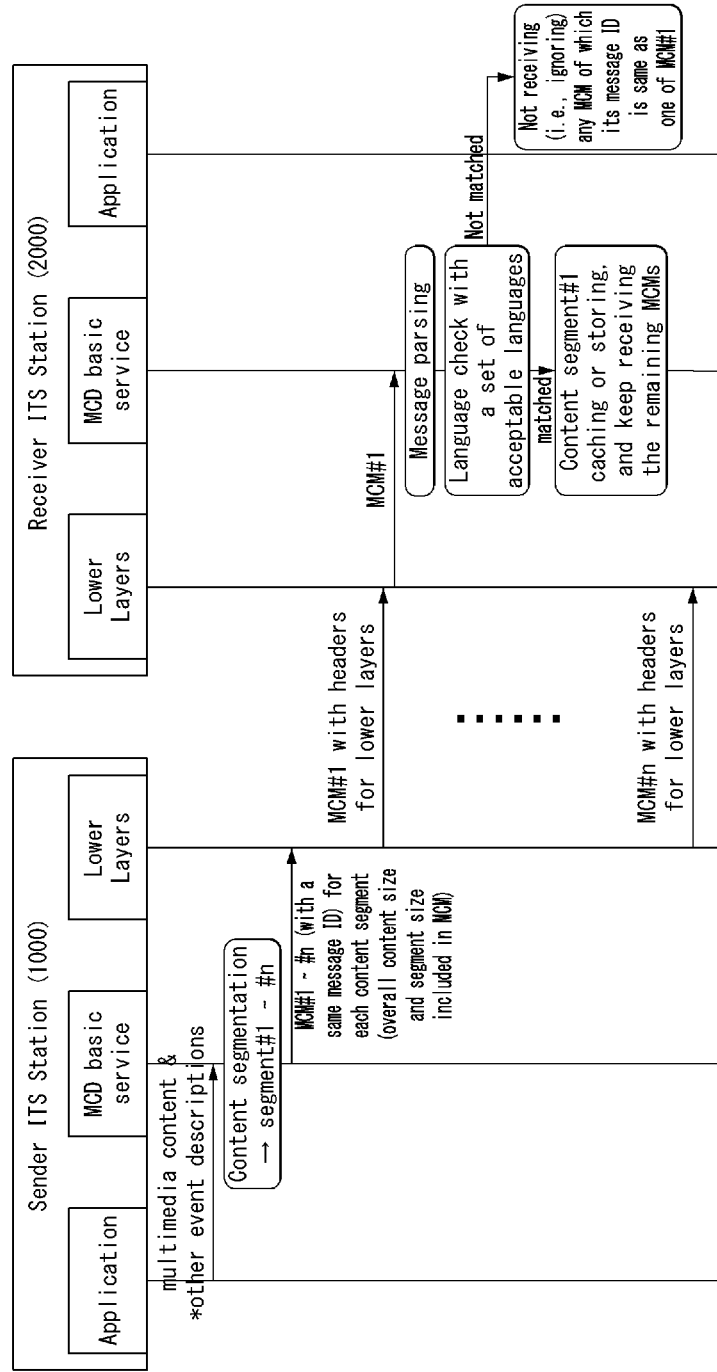
FIG. 30 illustrates an MCM transmitting/receiving method according to an embodiment of the present invention.

FIG. 30 illustrates an MCM transmitting/receiving method according to an embodiment of the present invention.

The information transmitted between the sender ITS station (ITS-S) 1000 and the receiver ITS station (ITS-S) 2000 may include an event description including a multimedia content and metadata related to the multimedia content. The multimedia content and the event description may be included in the MCM and delivered.

FIG. 30 illustrates an MCD operation when the multimedia content is divided into plural MCMs and delivered. In particular, FIG. 30 illustrates an embodiment in which the MCM includes language information. The same description as FIGS. 13 to 15 is not duplicated.

FIG. 30 illustrates language check mode A described above. That is, the MCD basic service entity performs the language check.

The receiver ITS station 2000 parses the MCM and performs the language check. The MCD basic service entity may verify whether the language of the content is the acceptable language by using the multimedia language information acquired from the MCM. The MCD basic service entity may verify whether the language of the content is the acceptable language based on the set of acceptable languages. When the language of the content of the received MCM is not the acceptable language, the receiver ITS station 2000 may not receive or ignore/discard MCMs having the same message ID as this MCM. When the language of the content of the received MCM is the acceptable language, the MCD basic service may cache/store multimedia segment #1 and receive remaining MCMs.

Figure 31:
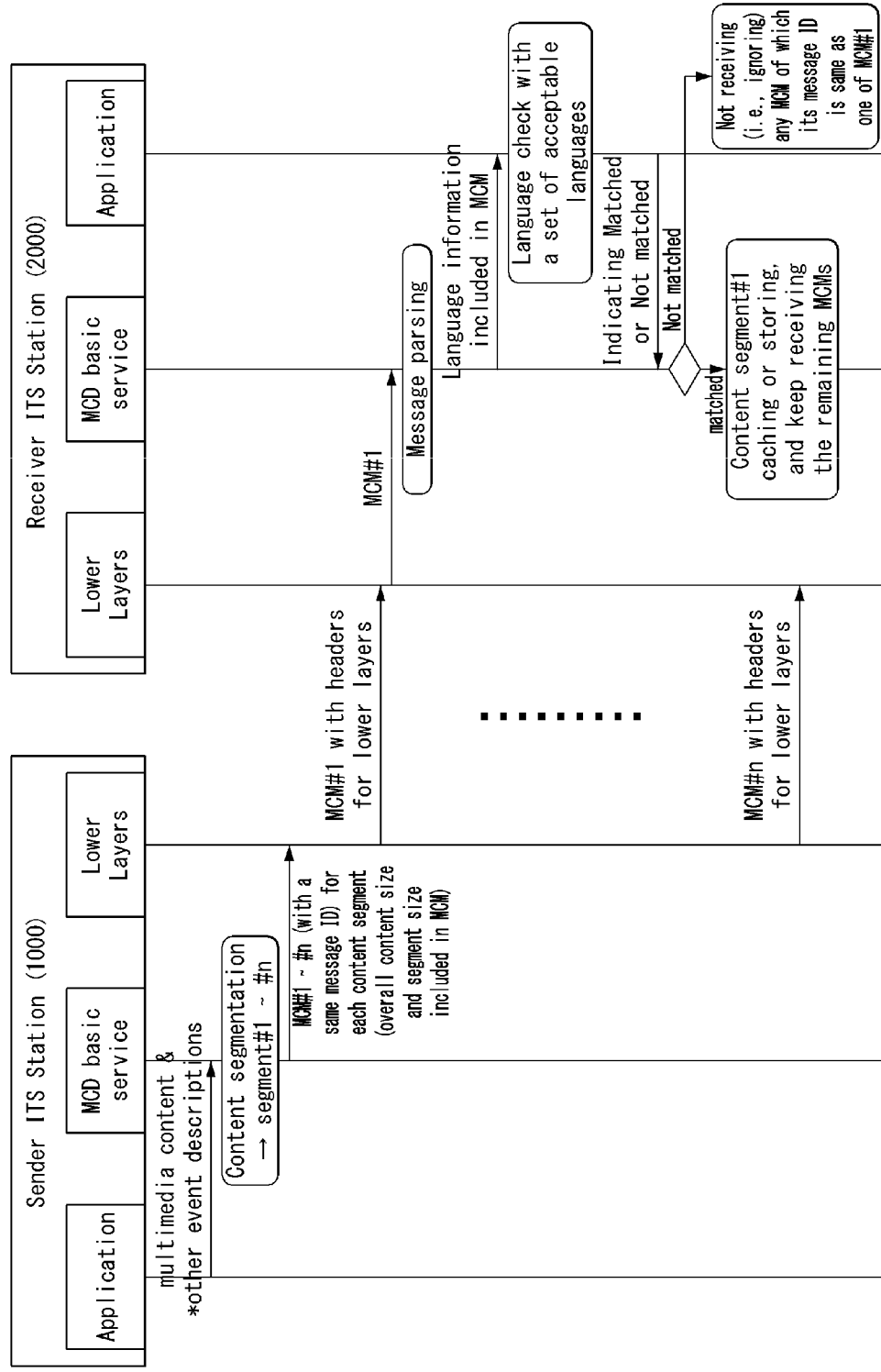
FIG. 31 illustrates an MCM transmitting/receiving method according to an embodiment of the present invention.

FIG. 31 illustrates an MCM transmitting/receiving method according to an embodiment of the present invention.

The information transmitted between the sender ITS station (ITS-S) 1000 and the receiver ITS station (ITS-S) 2000 may include an event description including a multimedia content and metadata related to the multimedia content. The multimedia content and the event description may be included in the MCM and delivered.

FIG. 31 illustrates an MCD operation when the multimedia content is divided into plural MCMs and delivered. In particular, FIG. 31 illustrates an embodiment in which the MCM includes language information. The same description as FIGS. 13 to 15 is not duplicated.

FIG. 31 illustrates language check mode B described above. That is, the application performs the language check.

The receiver ITS station 2000 parses the MCM and delivers the acquired language information to the application. The application performs the language check. The application may verify whether the language of the content is the acceptable language by using the multimedia language information. The application may verify whether the language of the content is the acceptable language based on the set of acceptable languages. The application may deliver a language check result to the MCD basic service entity. When the content of the received MCM is not the acceptable language, the receiver ITS station 2000 may not receive or ignore/discard MCMs having the same message ID as this MCM. When the language of the content of the received MCM is the acceptable language, the MCD basic service may cache/store multimedia segment #1 and receive remaining MCMs.

Figure 32:
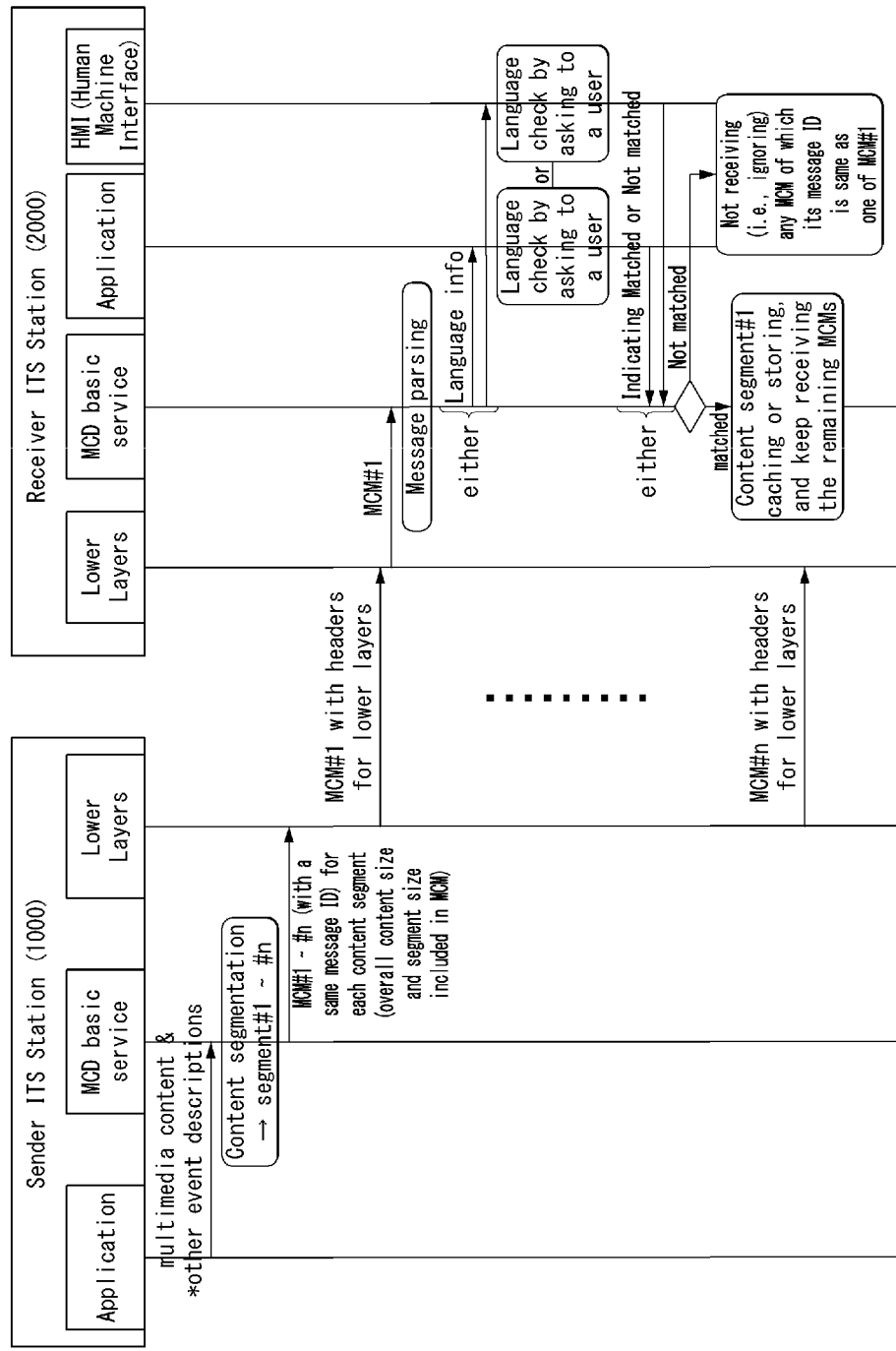
FIG. 32 illustrates an MCM transmitting/receiving method according to an embodiment of the present invention.

FIG. 32 illustrates an MCM transmitting/receiving method according to an embodiment of the present invention.

The information transmitted between the sender ITS station (ITS-S) 1000 and the receiver ITS station (ITS-S) 2000 may include an event description including a multimedia content and metadata related to the multimedia content. The multimedia content and the event description may be included in the MCM and delivered.

FIG. 32 illustrates an MCD operation when the multimedia content is divided into plural MCMs and delivered. In particular, FIG. 32 illustrates an embodiment in which the MCM includes the multimedia language information. The same description as FIGS. 13 to 15 is not duplicated.

FIG. 32 illustrates language check mode C or D described above. That is, the MCD basic service entity or application requests/queries the user for the language check.

The receiver ITS station 2000 parses the MCM and delivers the acquired language information to the application. The MCD basic service entity delivers the language information to the application or to the human machine interface (HIM). The MCD basic service may request the user to check the language via the HMI. Alternatively, the application may request the user to check the language directly or via the HMI.

When the language the content of the received MCM is not the acceptable language, the receiver ITS station 2000 may not receive or ignore/discard MCMs having the same message ID as this MCM. When the language of the content of the received MCM is the acceptable language, the MCD basic service may cache/store multimedia segment #1 and receive remaining MCMs.

Figure 33:
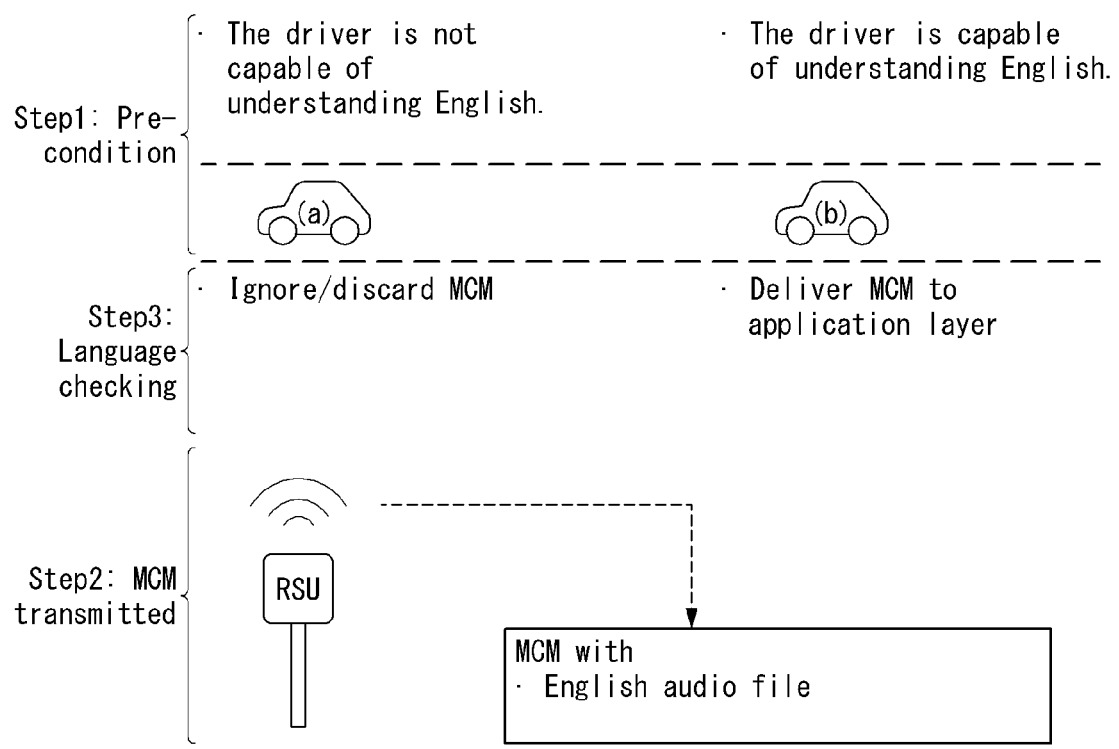
FIG. 33 illustrates an MCD operation using multimedia language information according to an embodiment of the present invention.

FIG. 33 illustrates an MCD operation using multimedia language information according to an embodiment of the present invention.

In FIG. 33, an RSU transmits an English audio file. The multimedia language information of the MCM to transmit the English audio file indicates English.

The statuses of the V2X apparatuses of respective vehicles, that is, the ITS-S, are different from each other. In the case of vehicle (a), the driver may not understand English. In the case of vehicle (b), the driver may understand English.

Each vehicle performs the language check as described above. Vehicle (a) may ignore the MCM and may not deliver the MCM to the application layer. That is, vehicle (a) may discard the MCM. Vehicle (b) may receive and process the MCM and deliver the processed file/segment to the application layer.

Figure 34:
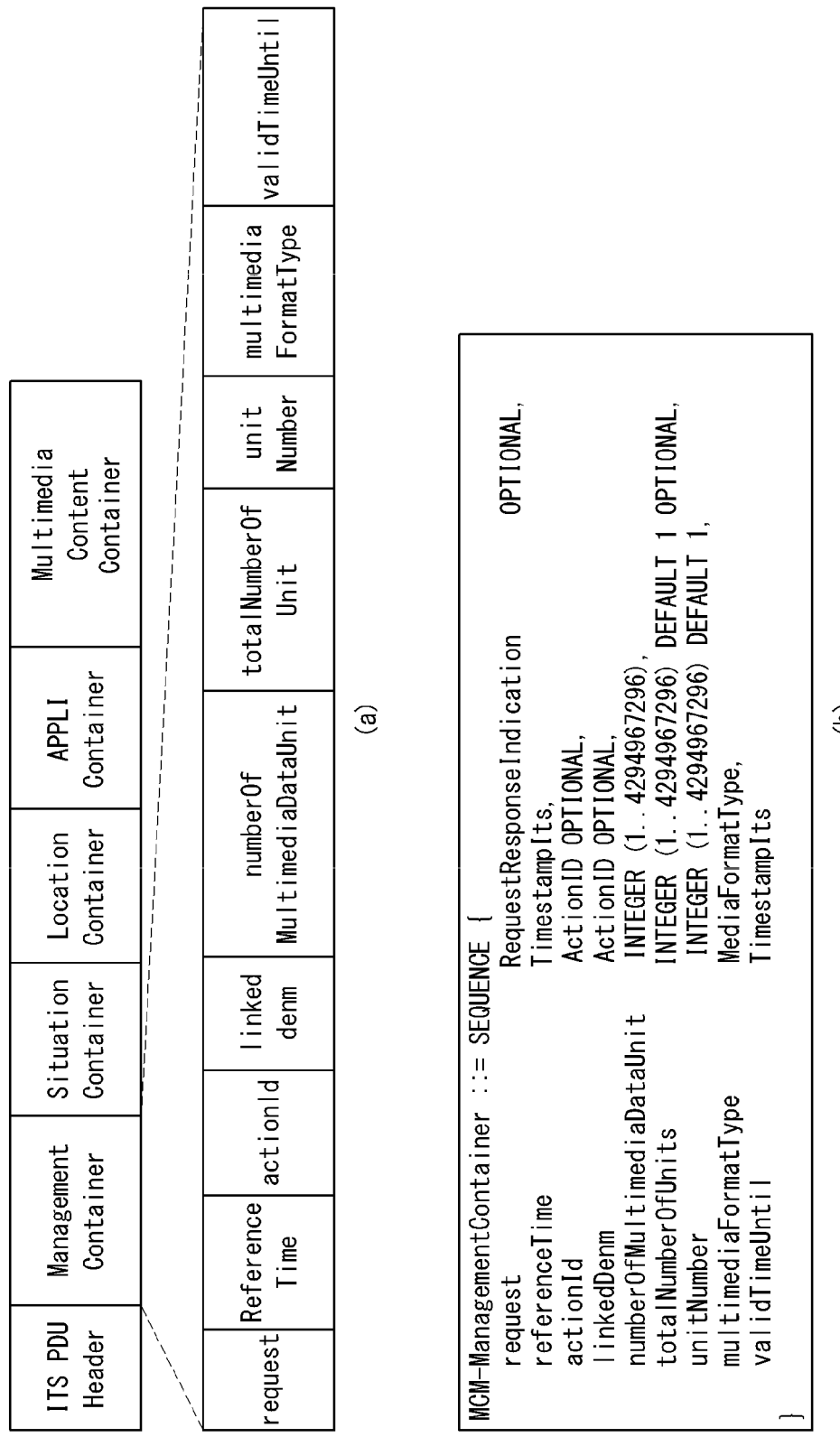
FIG. 34 illustrates a management container configuration of an MCM according to an embodiment of the present invention.

FIG. 34 illustrates a management container configuration of an MCM according to an embodiment of the present invention.

FIG. 34 illustrates the configuration of the management container included in the MCM illustrated in FIG. 10 and a description of the field/data is not duplicated.

FIG. 34(*a*) illustrates an MCM format including valid time (validTimeUntil) information and FIG. 34(*b*) illustrates a management container format including valid time (validTimeUntil) information. Except for the valid time (validTimeUntil) information, the information/field included in the management container will be described with reference to FIG. 16 and the related description.

The valid time information may use a time stamp (TimestampsIts) as a data type.

Although the multimedia content is a multimedia content received before the valid time, the receiver ITS-S may not provide the multimedia content when the valid time elapses, based on the valid time information of the received multimedia content. That is, after the valid time, the MCD basic service entity may not deliver the corresponding multimedia content to the application. After the valid time, the application does not use the corresponding multimedia content. After the valid time, the MCD basic service entity or management entity may delete the corresponding multimedia content from a storage or cache.

Figure 35:
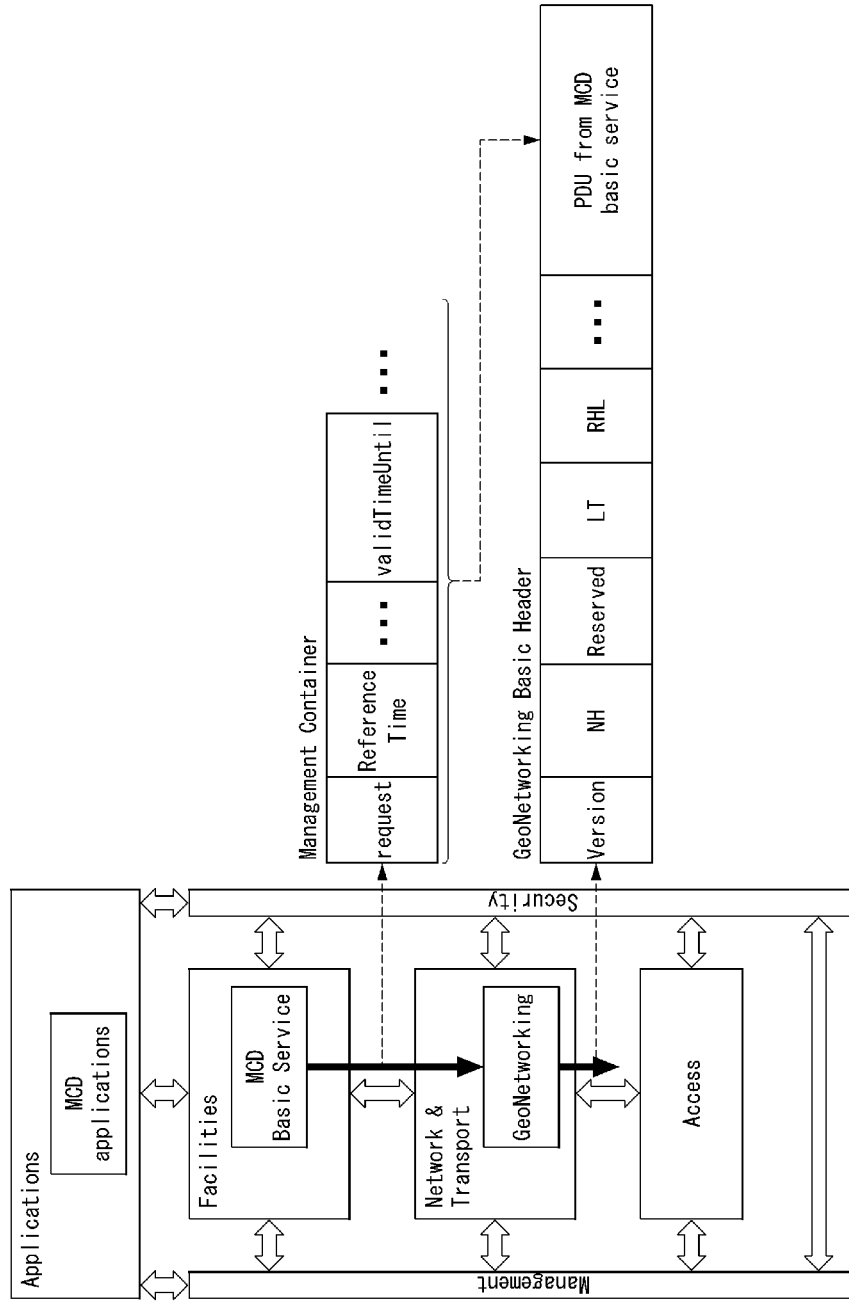
FIG. 35 illustrates a management container and a geonetworking basic header according to an embodiment of the present invention.

FIG. 35 illustrates a management container and a geonetworking basic header according to an embodiment of the present invention.

The basic header may include at least one of a version field, a next header (NH) field, a lifetime (LT) field, and a remaining hop limit (RHL) field. The description of the fields included in the basic header is as follows. A bit size configuring each field is just an embodiment and may be modified.

Version (4 bits): The version field indicates a version of the geo-networking protocol.

NH (4 bits): The next header (NH) field indicates the type of subsequent header/field. When a field value is 1, the common header may be followed and when the field value is 2, a secured packet in which the security is configured may be followed.

LT (8 bits): The life time (LT) field indicates a maximum survival time of the corresponding packet.

RHL (8 bits): A remaining hop limit (RHL) field indicates a remaining hop limit. An RHL field value may be reduced by one for each forwarding on a GeoAdhoc router. When the RHL field value is 0, the corresponding packet is not forwarded any longer.

The multimedia content may be multi-hop forwarded by using the geo-networking protocol. In this case, when the valid time elapses so as not occupy the channel, the multimedia content may be configured so as not to be forwarded any longer. That is, the ITS-S may stop forwarding the corresponding packet when a time of the LT field elapses. The forwarding ITS-S may perform forwarding without verifying information on the facility layer. The ITS station may perform forwarding without verifying the valid time. Therefore, the ITS-S may transmit the value of the LT field of the basic header of the geonetworking PDU by setting the value of the LT field to be equal to or smaller than the value of the valid time field of the MCM field.

The LT indicates a value of a survival time (lifetime) field of the geonetworking basic header. VTU indicates the value of the valid time (validTimeUntil) field in the management container of the PDU from the MCD basic service entity. CT indicates a time when the geonetworking PDU is generated. In this case, LT may be set to be equal to or less than a value acquired by subtracting the CT from the VTU (LT≤VTU−CT). The value of the LT need not exceed a difference between the valid time and the time when the geonetworking protocol data unit (PDU) is generated.

Figure 36:
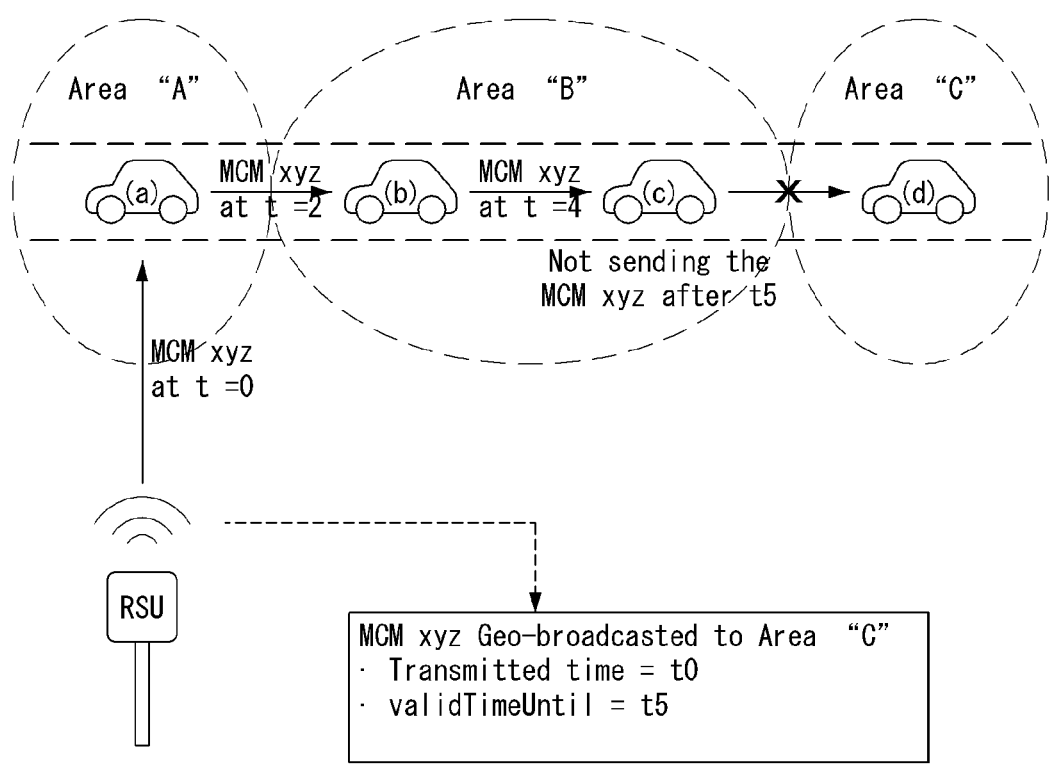
FIG. 36 illustrates an MCD operation using valid time information according to an embodiment of the present invention.

FIG. 36 illustrates an MCD operation using valid time information according to an embodiment of the present invention.

In FIG. 36, the RSU transmits MCM-xyz. The RSU geo-broadcasts the MCM. That is, the RSU geo-networking transmits the message so that the message is broadcasted in region "C". A time when the RSU transmits the MCM is t0 and valid time (validTimeUntil) information represents t5.

Vehicle (a) receives the MCM from the RSU and forwards the MCM at t=2.

Vehicle (b) receives the MCM from vehicle (a) and forwards the MCM at t=4.

Vehicle (c) receives the MCM from vehicle (b) and since the message does not yet reach region "C", vehicle (c) needs to forward the MCM. However, in respect to, a time when vehicle (c) forwards the MCM, t=5 has elapsed from t0. Therefore, vehicle (c) does not forward the MCM.

When the size of the multimedia content is larger than a specific criterion, the ITS-S may split the multimedia content into multiple segments and transmit the split segments as the multiple MCMs instead of transmitting the multimedia content as one MCM. A maximum size of a message that may be transmitted at a time may be decided based on an access layer technology used for message transmission. The access layer technology used for transmission may be selected by at least one of the application layer, the facility layer, the network/transport layer, or the management entity.

When the access layer technology is decided, the maximum message size may be decided. In addition, when a protocol data unit (PDU) is generated in each layer and delivered to the lower layer, the following scheme may be applied.

When layer A knows the maximum message size: a header size to be added in the lower layer is anticipated and a maximum PDU size of layer A is calculated, in which a message size to be finally transmitted over-the-air does not exceed the maximum message size. When an upper layer PDU received from the upper layer is larger than a maximum PDU size of layer A, a layer A PDU is generated by segmenting the PDU to be smaller than the maximum PDU size of layer A. In addition, the generated layer A PDU is delivered to the lower layer. The delivered upper layer PDU may be a media content file when layer is the application layer.

When layer A does not know the maximum message size: The PDU of layer A is generated by not segmenting the upper layer PDU received from the upper layer. In addition, the generated layer A PDU is delivered to the lower layer. The delivered upper layer PDU may be a media content file when layer is the application layer.

Figure 37:
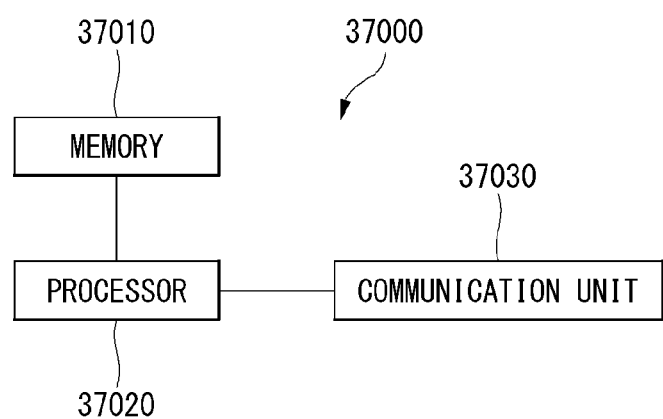
FIG. 37 illustrates a V2X communication apparatus according to an embodiment of the present invention.

FIG. 37 illustrates a V2X communication apparatus according to an embodiment of the present invention.

In FIG. 37, a V2X communication apparatus 3700 may include a memory 37010, a processor 37020, and a communication unit 37030. As described above, the V2X communication apparatus may correspond to on board unit (OBU) or a road side unit (RSU) or may be included in the OBU or RSU. The V2X communication apparatus may be included in the ITS station or may correspond to the ITS station.

The communication unit 37030 is connected with the processor 37020 to transmit and receive a radio signal. The communication unit 37030 may transmit a signal by up-converting data received from the processor 37020 to a transmission/reception band. The communication unit may implement of an operation of the access layer. As an embodiment, the communication unit may implement the operation of the physical layer included in the access layer or may further implement the operation of the MAC layer. The communication unit may include multiple sub communication units for communicating in accordance with multiple communication protocols.

The processor 37020 is connected with the communication unit 37030 to implement the operations of the layers according to the ITS system or the WAVE system. The processor 37020 may be configured to perform operations in accordance with various embodiments of the present invention in accordance with the aforementioned drawings and descriptions. Further, at least one of a module, data, a program, or software that implements the V2X communication apparatus 3700 according to various embodiments of the present invention may be stored in the memory 37010 and executed by the processor 37020.

The memory 37010 is connected with the processor 37020 to store various pieces of information for driving the processor 37020. The memory 37010 is included in the processor 37020 or installed outside the processor 37020 to be connected with the processor 37020 by a known means. The memory may include a security/non-security storage device or may be included in the security/non-security storage device. Depending on the embodiment, the memory may be referred to as the security/non-security storage device.

A detailed configuration of the V2X communication apparatus 37000 of FIG. 37 may be implemented such that various embodiments of the present invention described above are applied independently or two or more embodiments are applied together.

In relation with FIG. 2, a GNSS receiver and a DSRD radio may be included in the communication unit 37030 of FIG. 37. A DSRC device processor may be included in the communication unit 37030 of FIG. 37 or included in the processor 37020.

Figure 38:
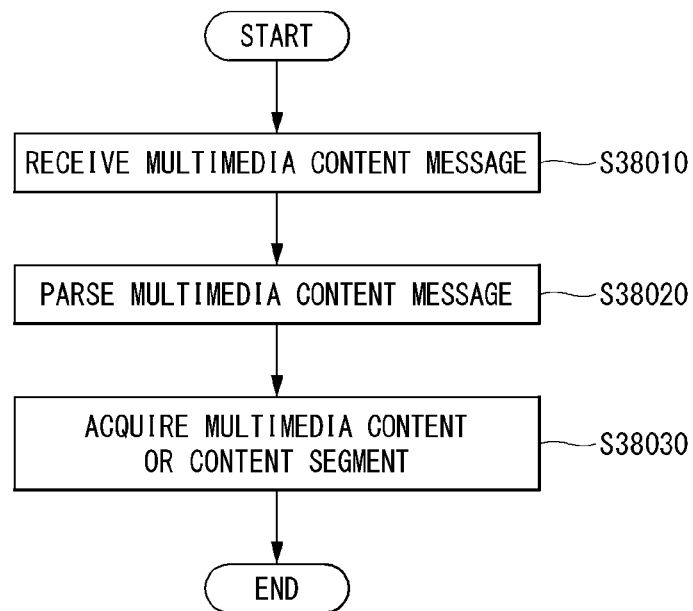
FIG. 38 illustrates a method for receiving a multimedia content message of a V2X communication apparatus according to an embodiment of the present invention.

FIG. 38 illustrates a method for receiving a multimedia content message of a V2X communication apparatus according to an embodiment of the present invention.

The V2X communication apparatus may receive the multimedia content message (S38010). The V2X communication apparatus may receive the multimedia content message based on various communication protocols.

The V2X communication apparatus may parse the multimedia content message (S38020). The V2X communication apparatus may parse the multimedia content message and acquire various information regarding the message.

The V2X communication apparatus may acquire the multimedia content or the content segment. The V2X communication apparatus may store/process the content or the content segment as described above and provide the stored/processed content/content segment to the user through the application. Further, the V2X communication apparatus may discard the content or the content segment without storing/processing the content or the content segment based on the information on the message as described above.

The multimedia content message includes at least one of a header including a protocol version and a message ID, a management container including multimedia content message (MCM) management and multimedia content dissemination (MCD) protocol related information, a situation container including information for describing an event, a location container including location information of the event, and a multimedia content container including the multimedia content.

The management container includes at least one of multimedia data unit number (numberOfMultimediaUnit) information which indicates the number of multimedia data units included in the multimedia container and multimedia format type (multimediaFormatType) information regarding the multimedia content included in the multimedia container.

The multimedia content message and the management container are described as described above.

As described above in connection with the embodiment of FIGS. 16 to 20, the management container may further include size information for at least one of the multimedia content or the segment of the multimedia content. The V2X communication apparatus may decide whether to store the multimedia content or the content segment based on the size information and storage information of the V2X communication apparatus.

As described above in connection with the embodiment of FIGS. 21 to 25, the management container may further include multimedia content identifier information. The V2X communication apparatus may decide whether the multimedia content or the segment of the multimedia content message overlaps with a previously received multimedia content based on the multimedia content identifier information.

As described above in connection with the embodiment of FIGS. 26 to 28, the management container may further include URL information. The V2X communication apparatus receives the multimedia content by accessing the URL indicated by the URL information.

As described above in connection with the embodiment of FIGS. 29 to 33, the management container may further include language information indicating the language of the multimedia content as described above. The V2X communication apparatus may decide whether the language of the multimedia content is the acceptable language based on the language information.

As described above in connection with the embodiment of FIGS. 34 to 36, the management container may further valid time information. The V2X communication apparatus may decide whether to provide or forward the multimedia content based on the valid time information.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

It will be understood by those skilled in the art that various changes and modifications can be made therein without departing from the spirit or scope of the invention. Accordingly, it is intended that the present invention cover the modifications and variations of the present invention provided they come within the scope of the appended claims and their equivalents.

In the present specification, all apparatus and method inventions are herein mentioned and descriptions of both apparatus and method inventions can be supplemented and applied to each other.

Various embodiments are described in a best mode for carrying out the present invention.

The present invention is used in a series of communication fields.

It will be apparent to those skilled in the art that various changes and modifications can be made therein without departing from the spirit or scope of the invention. Accordingly, it is intended that the present invention cover the modifications and variations of the present invention provided they come within the scope of the appended claims and their equivalents.

The invention claimed is:

1. A method for receiving a multimedia content message by a vehicle to everything (V2X) communication apparatus, the method comprising:
   receiving a multimedia content message including a multimedia content; and
   storing the multimedia content message based on storage information of the V2X communication apparatus and size information of the multimedia content, wherein the multimedia content message includes a header including a protocol version and a message ID, a management container including information of multimedia content message (MCM) related management and multimedia content dissemination (MCD) protocol, a situation container including information for describing an event, a location container including information of the location of the event, and a multimedia container including the multimedia content, wherein the management container includes multimedia data unit number (numberOfMultimediaUnit) information which indicates the number of multimedia data units included in the multimedia container, uniform resource locator (URL) information and multimedia format type (multimediaFormatType) information regarding the multimedia content, and wherein the URL information is related to a URL for receiving the multimedia content.

2. The method of claim 1, wherein the management container further includes the size information of the multimedia content.

3. The method of claim 1, wherein the management container further includes multimedia content identifier information, and the multimedia content message receiving method further comprises determining whether the multimedia content of the multimedia content message overlaps with a previously received multimedia content based on the multimedia content identifier information.

4. The method of claim 1, wherein the multimedia content message receiving method further comprises receiving the multimedia content by accessing the URL indicated by the URL information.

5. The method of claim 1, wherein the management container further includes language information indicating a language of the multimedia content, and the multimedia content message receiving method further comprises determining whether the language of the multimedia content is an acceptable language based on the language information.

6. The method of claim 1, wherein the management container further includes valid time information, and the multimedia content message receiving method further comprises determining whether to provide or forward the multimedia content based on the valid time information.

7. The method of claim 1, the method further comprising: parsing the multimedia content message.

8. A vehicle to everything (V2X) communication apparatus comprising:

a memory storing data;

a communication unit transmitting and receiving a radio signal; and a processor controlling the communication unit, wherein the V2X communication apparatus receives a multimedia content message including a multimedia content, and stores the multimedia content message based on storage information of the memory and size information of the multimedia content, wherein the multimedia content message includes a header including a protocol version and a message ID, a management container including information of multimedia content message (MCM) related management and multimedia content dissemination (MCD) protocol, a situation container including information for describing an event, a location container including information of the location of the event, and a multimedia container including the multimedia content, wherein the management container includes multimedia data unit number (numberOfMultimediaUnit) information which indicates the number of multimedia data units included in the multimedia container, uniform resource locator (URL) information and multimedia format type (multimediaFormatType) information regarding the multimedia content, and wherein the URL information is related to a URL for receiving the multimedia content.

9. The V2X communication apparatus of claim 8, wherein the management container further includes the size information of the multimedia content.

10. The V2X communication apparatus of claim 8, wherein the management container further includes multimedia content identifier information, and the V2X communication apparatus determines whether the multimedia content of the multimedia content message overlaps with a previously received multimedia content based on the multimedia content identifier information.

11. The V2X communication apparatus of claim 8, wherein the V2X communication apparatus receives the multimedia content by accessing the URL indicated by the URL information.

12. The V2X communication apparatus of claim 8, wherein the management container further includes language information indicating a language of the multimedia content, and the V2X communication apparatus determines whether the language of the multimedia content is an acceptable language based on the language information.

13. The V2X communication apparatus of claim 8, wherein the management container further includes valid time information, and the V2X communication apparatus determines whether to provide or forward the multimedia content based on the valid time information.

14. The V2X communication apparatus of claim 8, wherein the V2X communication apparatus parses the multimedia content message.

* * * * *